US012309564B2

(12) United States Patent
Pan

(10) Patent No.: US 12,309,564 B2
(45) Date of Patent: May 20, 2025

(54) AUDIO PROCESSING METHOD, APPARATUS, SYSTEM, AND STORAGE MEDIUM

(71) Applicant: WAVARTS TECHNOLOGIES CO., LTD., Beijing (CN)

(72) Inventor: Xingde Pan, Beijing (CN)

(73) Assignee: WAVARTS TECHNOLOGIES CO., LTD., Beijing (CN)

( * ) Notice: Subject to any disclaimer, the term of this patent is extended or adjusted under 35 U.S.C. 154(b) by 217 days.

(21) Appl. No.: 18/156,579

(22) Filed: Jan. 19, 2023

(65) Prior Publication Data

US 2023/0156403 A1 May 18, 2023

Related U.S. Application Data

(63) Continuation of application No. PCT/CN2021/081459, filed on Mar. 18, 2021.

(30) Foreign Application Priority Data

Jul. 31, 2020 (CN) ......................... 202010762076.3

(51) Int. Cl.
*H04R 3/00* (2006.01)
*H04R 1/10* (2006.01)
(Continued)

(52) U.S. Cl.
CPC ............. *H04R 5/04* (2013.01); *H04R 1/1041* (2013.01); *H04R 5/033* (2013.01); *H04S 3/008* (2013.01);
(Continued)

(58) Field of Classification Search
CPC ........ H04R 5/04; H04R 1/1041; H04R 5/033; H04R 2420/07; H04S 3/008; H04S 7/304; H04S 2400/01
(Continued)

(56) References Cited

U.S. PATENT DOCUMENTS

| | | | |
|---|---|---|---|
| 2018/0073886 | A1 | 3/2018 | Ilse et al. |
| 2018/0091920 | A1 | 3/2018 | Family |
| 2020/0196058 | A1 | 6/2020 | Udesen |

FOREIGN PATENT DOCUMENTS

| | | | |
|---|---|---|---|
| CN | 107113524 | A | 8/2017 |
| CN | 110825338 | A | 2/2020 |

(Continued)

OTHER PUBLICATIONS

Supplementary European Search Report of corresponding European Application No. 21850364.7, dated Nov. 24, 2023, 8 pages.

(Continued)

*Primary Examiner* — Ammar T Hamid

(74) *Attorney, Agent, or Firm* — Tucker Ellis LLP

(57) ABSTRACT

Provided are an audio processing method, apparatus, system and a storage medium. Firstly, a wireless earphone receives a to-be-presented audio signal sent by a playback device in a wireless transmission mode. The to-be-presented audio signal includes an audio signal that has undergone rendering processing performed the playback device, namely a first audio signal, and includes an audio signal that is to be rendered, namely a second audio signal. Then, if the to-be-presented audio signal includes the second audio signal, the wireless earphone performs rendering processing on the second audio signal, to obtain a third audio signal. Finally, the wireless earphone performs subsequent audio playing, according to the first audio signal and/or the third audio signal.

17 Claims, 9 Drawing Sheets

(51) Int. Cl.
*H04R 5/033* (2006.01)
*H04R 5/04* (2006.01)
*H04S 3/00* (2006.01)
*H04S 7/00* (2006.01)

(52) U.S. Cl.
CPC .......... *H04S 7/304* (2013.01); *H04R 2420/07* (2013.01); *H04S 2400/01* (2013.01); *H04S 2420/01* (2013.01)

(58) Field of Classification Search
USPC .......................................................... 381/311
See application file for complete search history.

(56) References Cited

FOREIGN PATENT DOCUMENTS

| | | | | |
|---|---|---|---|---|
| CN | 111194561 A | 5/2020 | | |
| CN | 111246331 A | 6/2020 | | |
| CN | 111918177 A | 11/2020 | | |
| EP | 3687193 A1 * | 7/2020 | ............. | G01S 15/06 |
| WO | WO-2019152783 A1 * | 8/2019 | ........... | G02B 27/017 |

OTHER PUBLICATIONS

International Search Report of corresponding International Application No. PCT/CN2021/081459, dated Jun. 18, 2021, 13 pages.
First Office Action of corresponding Chinese Application No. 202010762076.3, dated May 8, 2024, 30 pages.

* cited by examiner

AUDIO PROCESSING METHOD, APPARATUS, SYSTEM, AND STORAGE MEDIUM

CROSS-REFERENCE TO RELATED APPLICATIONS

The present disclosure is a continuation of the International application PCT/CN2021/081459, filed on Mar. 18, 2021. This International application claims priority to Chinese Patent Application No. 202010762076.3, which was filed with China National Intellectual Property Administration on Jul. 31, 2020. The disclosures of the above patent applications are incorporated herein by reference in their entireties.

TECHNICAL FIELD

The disclosure relates to the technical field of electronics, in particular to an audio processing method, apparatus, system and storage medium.

BACKGROUND

With the development of intelligent mobile devices, earphone has become a necessity for people to listen to sound in daily life. Due to its convenience, wireless earphone is more and more popular in the market, and even gradually becomes a mainstream earphone product. This is accompanied with people's increasing requirements for a sound quality. People not only gradually tend to pursue a lossless sound quality, but also gradually tend to pursue an improved sense of space and immersion in sound. Starting from the initial mono and stereo, till now, more people are pursuing 360° surround sound and real three-dimensional Atmos with all-round immersion.

At present, the existing wireless earphones, such as the traditional wireless Bluetooth earphones and TWS true wireless stereo earphones, can only present a two-channel stereo sound field, an experience sense of which can't satisfy people's actual requirements more and more, especially a need for a sense of sound space when watching movies and a need for sound orientation when playing games.

Therefore, how to present a real surround sound and Atmos effect in the earphone, especially in the increasingly popular wireless earphone, has become an urgent technical problem.

SUMMARY

The disclosure provides an audio processing method, apparatus and system and a storage medium, to solve the technical problem of how to present, in a wireless earphone, a high-quality surround sound and an Atmos effect.

In a first aspect, an embodiment of the disclosure provides an audio processing method, applied to a wireless earphone, the method including:

receiving a to-be-presented audio signal sent by a playback device in a wireless transmission mode, where the to-be-presented audio signal includes a first audio signal and/or a second audio signal, the first audio signal is an audio signal that has undergone rendering processing performed by the playback device, and the second audio signal is an audio signal that is to be rendered;

performing the rendering processing on the second audio signal, to obtain a third audio signal, if the to-be-presented audio signal includes the second audio signal; and performing subsequent audio playing, according to the first audio signal and/or the third audio signal.

In a possible design, before the receiving the to-be-presented audio signal sent by the playback device in the wireless transmission mode, the method includes:

sending an indication signal to the playback device in the wireless transmission mode, where the indication signal is used to instruct the playback device to perform rendering on an original audio signal according to a corresponding preset processing mode, to obtain the to-be-presented audio signal.

In a possible design, before the sending the indication signal to the playback device in the wireless transmission mode, the method further includes:

acquiring a performance parameter of the wireless earphone, and determining the indication signal according to the performance parameter.

In a possible design, before the sending the indication signal to the playback device in the wireless transmission mode, the method further includes:

receiving audio characteristic information sent by the playback device, where the audio characteristic information includes a characteristic parameter of the original audio signal input to the playback device, and the characteristic parameter includes at least one of a code stream format, a channel parameter, an object parameter and a scene component parameter.

In an implementation, the indication signal includes an identification code;

where if the identification code is a first field, the playback device does not perform rendering on the original audio signal, the to-be-presented audio signal includes the second audio signal but not the first audio signal, and the wireless earphone performs full rendering on the original audio signal;

if the identification code is a second field, the playback device performs the full rendering on the original audio signal, the to-be-presented audio signal includes the first audio signal but not the second audio signal, and the wireless earphone performs no rendering on the original audio signal; and if the identification code is a third field, the playback device performs rendering on a part of the original audio signal, the to-be-presented audio signal includes the first audio signal and the second audio signal, and the wireless earphone performs rendering on a remaining part of the original audio signal.

In an implementation, after the receiving the to-be-presented audio signal sent by the playback device in the wireless transmission mode, the method further includes:

performing decoding processing on the to-be-presented audio signal, to obtain the first audio signal and/or the second audio signal.

In an implementation, the performing the rendering processing on the second audio signal, to obtain the third audio signal, includes:

performing the rendering processing on the second audio signal according to rendering metadata, to obtain the third audio signal, where the rendering metadata includes first metadata and second metadata, the first metadata is metadata at a side of the playback device, and the second metadata is metadata at a side of the wireless earphone.

In a possible design, the first metadata includes playback device sensor metadata, where the playback device sensor metadata is used to characterize a motion characteristic of the playback device; and/or the second metadata includes earphone sensor metadata and a head related transfer function HRTF database, where the earphone sensor metadata is used to characterize a motion characteristic of the wireless earphone.

In a possible design, the earphone sensor metadata is acquired by an earphone sensor, and the earphone sensor includes at least one of a gyroscope sensor, a head size sensor, a ranging sensor, a geomagnetic sensor and an acceleration sensor; and/or the playback device sensor metadata is acquired by a playback device sensor, and the playback device sensor includes at least one of a gyroscope sensor, a head size sensor, a ranging sensor, a geomagnetic sensor and an acceleration sensor.

In a possible design, the wireless earphone includes a first wireless earphone and a second wireless earphone;

the first wireless earphone or the second wireless earphone is provided with the earphone sensor; or each of the first wireless earphone and the second wireless earphone is provided with the earphone sensor, and the first wireless earphone and the second wireless earphone synchronize the earphone sensor metadata therebetween after respectively acquiring the earphone sensor metadata.

In a possible design, the first wireless earphone and the second wireless earphone are used to establish a wireless connection with the playback device, and the receiving the to-be-presented audio signal sent by the playback device in the wireless transmission mode includes:

receiving, by the first wireless earphone, a first to-be-presented audio signal sent by the playback device, and receiving, by the second wireless earphone, a second to-be-presented audio signal sent by the playback device; and correspondingly, the performing rendering processing in the wireless earphone includes:

performing the rendering processing, by the first wireless earphone, on the first to-be-presented audio signal, to obtain a first playback audio signal, and performing the rendering processing, by the second wireless earphone, on the second to-be-presented audio signal, to obtain a second playback audio signal; and playing the first playback audio signal by the first wireless earphone, and playing the second playback audio signal by the second wireless earphone.

In a possible design, before the performing the rendering processing, by the first wireless earphone, on the first to-be-presented audio signal, the method further includes:

performing decoding processing, by the first wireless earphone, on the first to-be-presented audio signal, to obtain a first decoded audio signal; and correspondingly, the performing the rendering processing, by the first wireless earphone, on the first to-be-presented audio signal includes:

performing the rendering processing, by the first wireless earphone, according to the first decoded audio signal and the rendering metadata, to obtain the first playback audio signal; and before the performing the rendering processing, by the second wireless earphone, on the second to-be-presented audio signal, the method further includes:

performing decoding processing, by the second wireless earphone, on the second to-be-presented audio signal, to obtain a second decoded audio signal; and correspondingly, the performing the rendering processing, by the second wireless earphone, on the second to-be-presented audio signal, includes:

performing the rendering processing, by the second wireless earphone, according to the second decoded audio signal and the rendering metadata, to obtain the second playback audio signal.

In a possible design, the rendering metadata includes at least one of first wireless earphone metadata, second wireless earphone metadata and playback device metadata.

In a possible design, the first wireless earphone metadata includes first earphone sensor metadata and a head related transfer function HRTF database, where the first earphone sensor metadata is used to characterize a motion characteristic of the first wireless earphone;

the second wireless earphone metadata includes second earphone sensor metadata and a head related transfer function HRTF database, where the second earphone sensor metadata is used to characterize a motion characteristic of the second wireless earphone; and the playback device metadata includes playback device sensor metadata, where the playback device sensor metadata is used to characterize a motion characteristic of the playback device.

In a possible design, before the performing the rendering processing, the method further includes:

synchronizing the rendering metadata between the first wireless earphone and the second wireless earphone.

In a possible design, if the first wireless earphone is provided with an earphone sensor, the second wireless earphone is not provided with an earphone sensor, and the playback device is not provided with a playback device sensor, the synchronizing the rendering metadata between the first wireless earphone and the second wireless earphone includes:

sending, by the first wireless earphone, the first earphone sensor metadata to the second wireless earphone, and taking, by the second wireless earphone, the first earphone sensor metadata as the second earphone sensor metadata.

In a possible design, if each of the first wireless earphone and the second wireless earphone is provided with an earphone sensor, and the playback device is not provided with a playback device sensor, the synchronizing the rendering metadata between the first wireless earphone and the second wireless earphone includes:

sending, by the first wireless earphone, the first earphone sensor metadata to the second wireless earphone, and sending, by the second wireless earphone, the second earphone sensor metadata to the first wireless earphone; and determining, by each of the first wireless earphone and the second wireless earphone, the rendering metadata, according to the first earphone sensor metadata, the second earphone sensor metadata and a preset numerical algorithm; or sending, by the first wireless earphone, the first earphone sensor metadata to the playback device, and sending, by the second wireless earphone, the second earphone sensor metadata to the playback device, to cause the playback device to determine the rendering metadata, according to the first earphone sensor metadata, the second earphone sensor metadata and a preset numerical algorithm; and receiving, by each of the first wireless earphone and the second wireless earphone, the rendering metadata.

In a possible design, if the first wireless earphone is provided with an earphone sensor, the second wireless earphone is not provided with an earphone sensor, and the playback device is provided with a playback device sensor, the synchronizing the rendering metadata between the first wireless earphone and the second wireless earphone includes:

sending, by the first wireless earphone, the first earphone sensor metadata to the playback device, to cause the playback device to determine the rendering metadata, according to the first earphone sensor metadata, the playback device sensor metadata and a preset numerical algorithm; and receiving, by each of the first wireless earphone and the second wireless earphone, the rendering metadata; or receiving, by the first wireless earphone, the playback device sensor metadata sent by the playback device; determining, by the first wireless earphone, the rendering metadata, according to the first earphone sensor metadata, the playback device sensor metadata and a preset numerical algorithm; and sending, by the first wireless earphone, the rendering metadata to the second wireless earphone.

In a possible design, if each of the first wireless earphone and the second wireless earphone is provided with an earphone sensor, and the playback device is provided with a playback device sensor, the synchronizing the rendering metadata between the first wireless earphone and the second wireless earphone includes:

sending, by the first wireless earphone, the first earphone sensor metadata to the playback device, and sending, by the second wireless earphone, the second earphone sensor metadata to the playback device, to cause the playback device to determine the rendering metadata, according to the first earphone sensor metadata, the second earphone sensor metadata, the playback device sensor metadata and a preset numerical algorithm; and receiving, by each of the first wireless earphone and the second wireless earphone, the rendering metadata; or sending, by the first wireless earphone, the first earphone sensor metadata to the second wireless earphone, and sending, by the second wireless earphone, the second earphone sensor metadata to the first wireless earphone; receiving, by each of the first wireless earphone and the second wireless earphone, the playback device sensor metadata; and determining, by each of the first wireless earphone and the second wireless earphone, the rendering metadata, according to the first earphone sensor metadata, the second earphone sensor metadata, the playback device sensor metadata and a preset numerical algorithm.

In an implementation, the to-be-presented audio signal includes at least one of a channel-based audio signal, an object-based audio signal and a scene-based audio signal.

In an implementation, the rendering processing includes at least one of binaural virtual rendering, channel signal rendering, object signal rendering and scene signal rendering.

In an implementation, the wireless transmission mode includes Bluetooth communication, infrared communication, WIFI communication and LIFI visible light communication.

In a second aspect, an embodiment of the present disclosure provides an audio processing method applied to a playback device, the method including:

acquiring an original audio signal, and generating a to-be-presented audio signal according to the original audio signal, where the to-be-presented audio signal includes a first audio signal and/or a second audio signal, the first audio signal is an audio signal that has undergone rendering processing performed by the playback device, and the second audio signal is an audio signal that is to be rendered; and sending the to-be-presented audio signal to a wireless earphone in a wireless transmission mode.

In a possible design, before the sending the to-be-presented audio signal to the wireless earphone in the wireless transmission mode, the method includes:

receiving an indication signal sent by the wireless earphone in the wireless transmission mode, where the indication signal is used to instruct the playback device to perform rendering on the original audio signal according to a corresponding preset processing mode, to obtain the to-be-presented audio signal.

In a possible design, before the sending the to-be-presented audio signal to the wireless earphone in a wireless transmission mode, the method further includes:

receiving a performance parameter of the wireless earphone in the wireless transmission mode, and determining an indication signal according to the performance parameter, where the indication signal is used to instruct the playback device to perform rendering on the original audio signal according to a corresponding preset processing mode, to obtain the to-be-presented audio signal.

In a possible design, the receiving the performance parameter of the wireless earphone in the wireless transmission mode, and determining the indication signal according to the performance parameter includes:

acquiring a characteristic parameter of the original audio signal, where the characteristic parameter includes at least one of a code stream format, a channel parameter, an object parameter and a scene component parameter; and determining the indication signal, according to the characteristic parameter and the performance parameter.

In a possible design, the indication signal includes an identification code;

where if the identification code is a first field, the playback device does not perform rendering on the original audio signal, the to-be-presented audio signal includes the second audio signal but not the first audio signal, and the wireless earphone performs full rendering on the original audio signal;

if the identification code is a second field, the playback device performs the full rendering on the original audio signal, the to-be-presented audio signal includes the first audio signal but not the second audio signal, and the wireless earphone performs no rendering on the original audio signal; and if the identification code is a third field, the playback device performs rendering on a part of the original audio signal, the to-be-presented audio signal includes the first audio signal and the second audio signal, and the wireless earphone performs rendering on a remaining part of the original audio signal.

In an implementation, the original audio signal includes a fourth audio signal and/or a fifth audio signal, where the fourth audio signal is used to generate, after being processed, the first audio signal, and the fifth audio signal is used to generate the second audio signal;

correspondingly, after the acquiring the original audio signal, the method further includes:

performing decoding processing on the fourth audio signal, to obtain a sixth audio signal, where the sixth audio signal includes a seventh audio signal and/or an eighth audio signal;

performing rendering processing on the seventh audio signal, to obtain a ninth audio signal; and performing encoding processing on the eighth audio signal and the ninth audio signal, to obtain a tenth audio signal, and the to-be-presented audio signal includes the fifth audio signal and the tenth audio signal.

In a possible design, the performing the rendering processing on the seventh audio signal includes:

performing the rendering processing on the seventh audio signal according to rendering metadata, to obtain the ninth audio signal, where the rendering metadata includes first metadata and second metadata, the first metadata is metadata at a side of the playback device, and the second metadata is metadata at a side of the wireless earphone.

In a possible design, the first metadata includes playback device sensor metadata, where the playback device sensor metadata is used to characterize a motion characteristic of the playback device; and/or the second metadata includes earphone sensor metadata and a head related transfer function HRTF database, where the earphone sensor metadata is used to characterize a motion characteristic of the wireless earphone.

In a possible design, the earphone sensor metadata is acquired by an earphone sensor, and the earphone sensor includes at least one of a gyroscope sensor, a head size sensor, a ranging sensor, a geomagnetic sensor and an acceleration sensor; and/or the playback device sensor metadata is acquired by a playback device sensor, and the playback device sensor includes at least one of a gyroscope sensor, a head size sensor, a ranging sensor, a geomagnetic sensor and an acceleration sensor.

In an implementation, the to-be-presented audio signal includes at least one of a channel-based audio signal, an object-based audio signal and a scene-based audio signal.

In an implementation, the rendering processing includes at least one of binaural virtual rendering, channel signal rendering, object signal rendering and scene signal rendering.

In an implementation, the wireless transmission mode includes Bluetooth communication, infrared communication, WIFI communication and LIFI visible light communication.

In a third aspect, an embodiment of the present disclosure provides an audio processing apparatus, including:

an acquiring module, configured to receive a to-be-presented audio signal sent by a playback device in a wireless transmission mode, where the to-be-presented audio signal includes a first audio signal and/or a second audio signal, the first audio signal is an audio signal that has undergone rendering processing performed by the playback device, and the second audio signal is an audio signal that is to be rendered;

a rendering module, configured to perform the rendering processing on the second audio signal, to obtain a third audio signal, when the to-be-presented audio signal includes the second audio signal; and a playing module, configured to perform subsequent audio playing, according to the first audio signal and/or the third audio signal.

In a possible design, before the receiving module receives the to-be-presented audio signal sent by the playback device in the wireless transmission mode, the apparatus further includes:

a sending module, configured to send an indication signal to the playback device in the wireless transmission mode, where the indication signal is used to instruct the playback device to perform rendering on an original audio signal according to a corresponding preset processing mode, to obtain the to-be-presented audio signal.

In a possible design, before the sending module sends the indication signal to the playback device in the wireless transmission mode, the acquiring module is further configured to acquire a performance parameter of a wireless earphone, and determine the indication signal according to the performance parameter.

In a possible design, before the sending module sends the indication signal to the playback device in the wireless transmission mode, the acquiring module is further configured to receive audio characteristic information sent by the playback device, where the audio characteristic information includes a characteristic parameter of the original audio signal input to the playback device, and the characteristic parameter includes at least one of a code stream format, a channel parameter, an object parameter and a scene component parameter.

In a possible design, the indication signal includes an identification code;

where if the identification code is a first field, the playback device does not perform rendering on the original audio signal, the to-be-presented audio signal includes the second audio signal but not the first audio signal, and the audio processing apparatus performs full rendering on the original audio signal;

if the identification code is a second field, the playback device performs the full rendering on the original audio signal, the to-be-presented audio signal includes the first audio signal but not the second audio signal, and the audio processing apparatus performs no rendering on the original audio signal; and if the identification code is a third field, the playback device performs rendering on a part of the original audio signal, the to-be-presented audio signal includes the first audio signal and the second audio signal, and the audio processing apparatus performs rendering on a remaining part of the original audio signal.

In a possible design, after the acquiring module receives the to-be-presented audio signal sent by the playback device in the wireless transmission mode, the apparatus further includes:

a decoding module, configured to decode the to-be-presented audio signal, to obtain the first audio signal and/or the second audio signal.

In a possible design, the rendering module is specifically configured to:

perform the rendering processing on the second audio signal according to rendering metadata, to obtain the third audio signal, where the rendering metadata includes first metadata and second metadata, the first metadata is metadata at a side of the playback device, and the second metadata is metadata at a side of the wireless earphone.

In a possible design, the first metadata includes first sensor module metadata, where the first sensor module metadata is used to characterize a motion characteristic of the playback device; and/or the second metadata includes second sensor module metadata and a head related transfer function HRTF database, where the second sensor module metadata is used to characterize a motion characteristic of the wireless earphone.

In a possible design, the first sensor module metadata is acquired by a first sensor module, and the first sensor module includes at least one of a gyroscope sensor sub-module, a head size sensor sub-module, a ranging sensor sub-module, a geomagnetic sensor sub-module and an acceleration sensor sub-module; and/or the second sensor module metadata is acquired by a second sensor module, and the second sensor module includes at least one of a gyroscope sensor sub-module, a head size sensor sub-module, a ranging sensor sub-module, a geomagnetic sensor sub-module and an acceleration sensor sub-module.

In a possible design, the audio processing apparatus includes a first audio processing apparatus and a second audio processing apparatus;

the first audio processing apparatus or the second audio processing apparatus is provided with the second sensor module; or each of the first audio processing apparatus and the second audio processing apparatus is provided with the second sensor module, and after the acquiring module of the first audio processing apparatus and the acquiring module of the second audio processing apparatus acquire playback device sensor metadata, each of the apparatuses further includes:

a synchronization module, configured to synchronize the playback device sensor metadata therebetween.

In a possible design, the first audio processing apparatus includes:

a first receiving module, configured to receive a first to-be-presented audio signal sent by the playback device;

a first rendering module, configured to perform the rendering processing on the first to-be-presented audio signal, to obtain a first playback audio signal; and a first playing module, configured to play the first playback audio signal; and the second audio processing apparatus includes:

a second receiving module, configured to receive a second to-be-presented audio signal sent by the playback device;

a second rendering module, configured to perform the rendering processing on the second to-be-presented audio signal, to obtain a second playback audio signal; and a second playing module, configured to play the second playback audio signal.

In a possible design, the first audio processing apparatus further includes:

a first decoding module, configured to perform decoding processing on the first to-be-presented audio signal, to obtain a first decoded audio signal; and the first rendering module is specifically configured to perform the rendering processing, according to the first decoded audio signal and the rendering metadata, to obtain the first playback audio signal; and the second audio processing apparatus further includes:

a second decoding module, configured to perform decoding processing on the second to-be-presented audio signal, to obtain a second decoded audio signal; and the second rendering module is specifically configured to perform the rendering processing, according to the second decoded audio signal and the rendering metadata, to obtain the second playback audio signal.

In a possible design, the rendering metadata includes at least one of first wireless earphone metadata, second wireless earphone metadata and playback device metadata.

In a possible design, the first wireless earphone metadata includes first earphone sensor metadata and a head related transfer function HRTF database, where the first earphone sensor metadata is used to characterize a motion characteristic of a first wireless earphone;

the second wireless earphone metadata includes a second earphone sensor metadata and a head related transfer function HRTF database, where the second earphone sensor metadata is used to characterize a motion characteristic of a second wireless earphone; and the playback device metadata includes playback device sensor metadata, where the playback device sensor metadata is used to characterize a motion characteristics of the playback device.

In a possible design, the first audio processing apparatus further includes:

a first synchronization module, configured to synchronize the rendering metadata with the second wireless earphone; and/or the second audio processing apparatus further includes:

a second synchronization module, configured to synchronize the rendering metadata with the first wireless earphone.

In a possible design, the first synchronization module is specifically configured to send the first earphone sensor metadata to the second wireless earphone, so that the second synchronization module takes the first earphone sensor metadata as the second earphone sensor metadata.

In a possible design, the first synchronization module is specifically configured to:

send the first earphone sensor metadata;

receive the second earphone sensor metadata; and determine the rendering metadata, according to the first earphone sensor metadata, the second earphone sensor metadata and a preset numerical algorithm; and the second synchronization module is specifically configured to:

send the second earphone sensor metadata;

receive the first earphone sensor metadata; and determine the rendering metadata, according to the first earphone sensor metadata, the second earphone sensor metadata and a preset numerical algorithm; or the first synchronization module is specifically configured to:

send the first earphone sensor metadata; and receive the rendering metadata; and the second synchronization module is specifically configured to:

send the second earphone sensor metadata; and receive the rendering metadata.

In a possible design, the first synchronization module is specifically configured to:

receive the playback device sensor metadata;

determine the rendering metadata, according to the first earphone sensor metadata, the playback device sensor metadata and a preset numerical algorithm; and send the rendering metadata.

In a possible design, the first synchronization module is specifically configured to:

send the first earphone sensor metadata;

receive the second earphone sensor metadata;

receive the playback device sensor metadata; and determine the rendering metadata, according to the first earphone sensor metadata, the second earphone sensor metadata, the playback device sensor metadata and a preset numerical algorithm; and the second synchronization module is specifically configured to:

send the second earphone sensor metadata;

receive the first earphone sensor metadata;

receive the playback device sensor metadata; and determine the rendering metadata, according to the first earphone sensor metadata, the second earphone sensor metadata, the playback device sensor metadata and a preset numerical algorithm.

In an implementation, the to-be-presented audio signal includes at least one of a channel-based audio signal, an object-based audio signal and a scene-based audio signal.

In an implementation, the rendering processing includes at least one of binaural virtual rendering, channel signal rendering, object signal rendering and scene signal rendering.

In an implementation, the wireless transmission mode includes Bluetooth communication, infrared communication, WIFI communication and LIFI visible light communication.

In a fourth aspect, an embodiment of the present disclosure provides an audio processing apparatus, including:

an acquiring module, configured to receive an original audio signal, and generate a to-be-presented audio signal according to the original audio signal, where the to-be-presented audio signal includes a first audio signal and/or a second audio signal, the first audio signal is an audio signal that has undergone rendering processing performed by a playback device, and the second audio signal is an audio signal that is to be rendered; and a sending module, configured to send the to-be-presented audio signal to a wireless earphone in a wireless transmission mode.

In a possible design, before the sending module sends the to-be-presented audio signal to the wireless earphone in the wireless transmission mode, the acquiring module is further configured to receive an indication signal sent by the wireless earphone in the wireless transmission mode, where the indication signal is used to instruct the playback device to perform rendering on the original audio signal according to a corresponding preset processing mode, to obtain the to-be-presented audio signal.

In a possible design, before the sending module sends the to-be-presented audio signal to the wireless earphone in the wireless transmission mode, the acquiring module is further configured to receive a performance parameter of the wireless earphone in the wireless transmission mode, and determine an indication signal according to the performance parameter, where the indication signal is used to instruct the playback device to perform rendering on the original audio signal according to a corresponding preset processing mode, to obtain the to-be-presented audio signal.

In a possible design, the acquiring module is further configured to:

acquire a characteristic parameter of the original audio signal, where the characteristic parameter includes at least one of a code stream format, a channel parameter, an object parameter and a scene component parameter; and determine the indication signal, according to the characteristic parameter and the performance parameter.

In an implementation, the indication signal includes an identification code;

where if the identification code is a first field, the playback device does not perform rendering on the original audio signal, the to-be-presented audio signal includes the second audio signal but not the first audio signal, and the wireless earphone performs full rendering on the original audio signal;

if the identification code is a second field, the playback device performs the full rendering on the original audio signal, the to-be-presented audio signal includes the first audio signal but not the second audio signal, and the wireless earphone performs no rendering on the original audio signal; and if the identification code is a third field, the playback device performs rendering on a part of the original audio signal, the to-be-presented audio signal includes the first audio signal and the second audio signal, and the wireless earphone performs rendering on a remaining part of the original audio signal.

In an implementation, the original audio signal includes a fourth audio signal and/or a fifth audio signal, where the fourth audio signal is used to generate, after being processed, the first audio signal, and the fifth audio signal is used to generate the second audio signal;

correspondingly, after the acquiring module acquires the original audio signal, the apparatus further includes:

a decoding module, configured to decode the fourth audio signal, to obtain a sixth audio signal, and the sixth audio signal includes a seventh audio signal and/or an eighth audio signal;

a rendering module, configured to perform rendering processing on the seventh audio signal, to obtain a ninth audio signal; and an encoding module, configured to encode the eighth audio signal and the ninth audio signal, to obtain a tenth audio signal, and the to-be-presented audio signal includes the fifth audio signal and the tenth audio signal.

In a possible design, the rendering module is specifically configured to:

perform the rendering processing on the seventh audio signal according to rendering metadata, to obtain the ninth audio signal, where the rendering metadata includes first metadata and second metadata, where the first metadata is metadata at a side of the playback device, and the second metadata is metadata at a side of the wireless earphone.

In a possible design, the first metadata includes a first sensor sub-module metadata, where the first sensor sub-module metadata is configured to characterize a motion characteristic of the playback device; and/or the second metadata includes second sensor sub-module metadata and a head related transfer function HRTF database, where the second sensor sub-module metadata is used to characterize a motion characteristic of the wireless earphone.

In a possible design, the first sensor sub-module metadata is acquired by a first sensor sub-module, and the first sensor sub-module includes at least one of a gyroscope sensor sub-module, a head size sensor sub-module, a ranging sensor sub-module, a geomagnetic sensor sub-module and an acceleration sensor sub-module; and/or the second sensor sub-module metadata is acquired by a second sensor sub-module, and the second sensor sub-module includes at least one of a gyroscope sensor sub-module, a head size sensor sub-module, a ranging sensor sub-module, a geomagnetic sensor sub-module and an acceleration sensor sub-module.

In an implementation, the to-be-presented audio signal includes at least one of a channel-based audio signal, an object-based audio signal and a scene-based audio signal.

In an implementation, the rendering processing includes at least one of binaural virtual rendering, channel signal rendering, object signal rendering and scene signal rendering.

In an implementation, the wireless transmission mode includes Bluetooth communication, infrared communication, WIFI communication and LIFI visible light communication.

In a fifth aspect, an embodiment of the present disclosure further provides a wireless earphone, including:

a processor; and a memory configured to store a computer program of the processor;

where the processor is configured to implement any one of the possible audio processing methods in the first aspect by executing the computer program.

In a sixth aspect, an embodiment of the present disclosure further provides a playback device, including:

a processor; and a memory configured to store a computer program of the processor;

where the processor is configured to implement any one of the possible audio processing methods in the second aspect by executing the computer program.

In a seventh aspect, an embodiment of the present disclosure further provides a computer readable storage medium having a computer program stored thereon, where the computer program, when being executed by a processor, causes any one of the possible audio processing methods in the first aspect to be implemented.

In an eighth aspect, an embodiment of the present disclosure further provides a computer readable storage medium having a computer program stored thereon, where the computer program, when being executed by a processor, causes any one of the possible audio processing methods in the second aspect to be implemented.

In a ninth aspect, an embodiment of the present disclosure further provides an audio processing system, including: the wireless earphone according to the fifth aspect and the playback device according to the sixth aspect.

The disclosure provides an audio processing method, apparatus, system and a storage medium. Firstly, a wireless earphone receives a to-be-presented audio signal sent by a playback device in a wireless transmission mode. The to-be-presented audio signal includes an audio signal that has undergone rendering processing performed by the playback device, i.e., a first audio signal, and includes an audio signal that is to be rendered, i.e., a second audio signal. Then, if the to-be-presented audio signal includes the second audio signal, the wireless earphone performs the rendering processing on the second audio signal, to obtain a third audio signal. Finally, the wireless earphone terminal performs subsequent audio playing according to the first audio signal and/or the third audio signal. In this way, it enables technical effects that the wireless earphone can present a high-quality surround sound and an Atmos effect.

BRIEF DESCRIPTION OF DRAWINGS

In order to more clearly explain the embodiments of the present disclosure or the technical solutions in the prior art, the following will briefly introduce the drawings that need to be used in the description of the embodiments or the prior art. Obviously, the drawings in the following description are intended for some embodiments of the present disclosure. For those of ordinary skill in the art, other drawings can be acquired according to these drawings on the premise of no creative labor.

Through the above drawings, specific embodiments of the present disclosure have been shown, which will be described in more detail later. These drawings and written descriptions are not intended to limit the scope of the concept of the present disclosure in any way, but to explain the concept of the present disclosure to those skilled in the art by referring to specific embodiments.

DESCRIPTION OF EMBODIMENTS

In order to make the objective, technical solutions and advantages of the embodiments of the present disclosure clearer, the technical solutions in the embodiments of the present disclosure will be clearly and comprehensively described below with reference to the drawings in the embodiments of the present disclosure. Obviously, the described embodiments are a part of the embodiments of the present disclosure, but not all the embodiments. Based on the embodiments of the present disclosure, all other embodiments acquired by ordinary technicians in the field without creative labor, which include but are not limited to combinations of multiple embodiments, shall fall into the scope of protection of the present disclosure.

Terms such as "first", "second", "third", "fourth" and the like (if any) in the specification and the claims as well as the described accompany drawings of the present disclosure are used to distinguish similar objects, but not intended to describe a specific order or sequence. It will be appreciated that the data used in this way is exchangeable under appropriate circumstances, so that the embodiments of the present disclosure described herein can be implemented in an order other than those illustrated or described herein, for example. Moreover, terms such as "comprise" and "have" and any variation thereof are intended to cover a non-exclusive inclusion, e.g., processes, methods, systems, products or devices that contain a series of steps or units are not necessarily limited to those steps or units that are clearly listed, but may comprise other steps or units that are not explicitly listed or inherent to these processes, methods, products or devices.

The technical solutions of the present disclosure and how the technical solutions of the present disclosure can solve the above technical problems will be explained in detail by specific examples below. The following specific embodiments may be combined with each other, and the same or similar concepts or processes may not be described in detail in some embodiments. Embodiments of the present disclosure will be described below with reference to the drawings.

Figure 1:
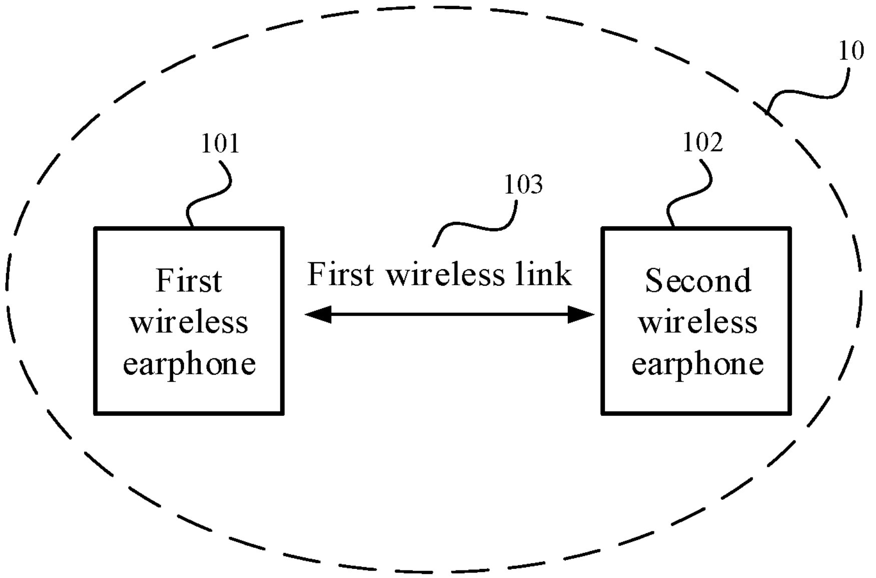
FIG. 1 is a schematic structural diagram of a wireless earphone according to an exemplary embodiment of the present disclosure.
Figure 2:
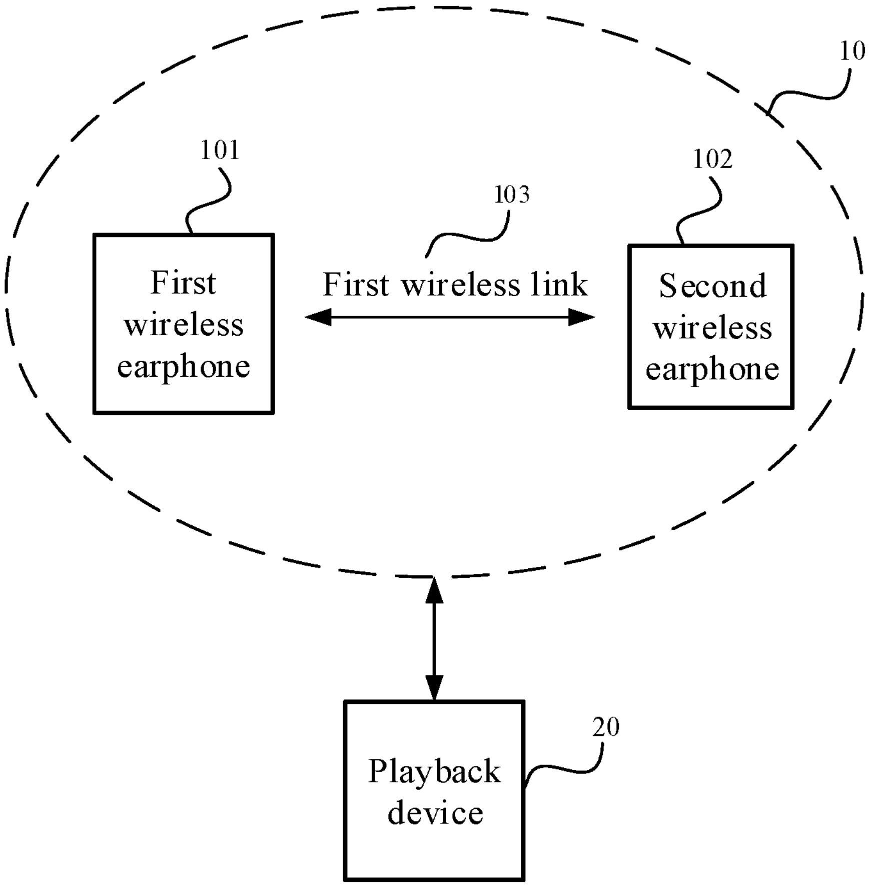
FIG. 2 is a schematic diagram of an application scenario of an audio processing method according to an exemplary embodiment of the present disclosure.

FIG. 1 is a schematic structural diagram of a wireless earphone according to an exemplary embodiment of the present disclosure. FIG. 2 is a schematic diagram illustrating an application scenario of an audio processing method according to an exemplary embodiment of the present disclosure. As shown in FIG. 1 and FIG. 2, the wireless transceiver group communication method provided in the present embodiment is applied to a wireless earphone 10, where the wireless earphone 10 includes a first wireless earphone 101 and a second wireless earphone 102, and the wireless transceivers in the wireless earphone 10 communicate therebetween via a first wireless link 103. It is worth noting that the communication connection between the wireless earphone 101 and the wireless earphone 102 in the wireless earphone 10 may be bidirectional or unidirectional, which is not limited in the present embodiment. In addition, it is appreciated that the wireless earphone 10 and the playback device 20 may be wireless transceivers that communicate according to a standard wireless protocol, where the standard wireless protocol may be Bluetooth protocol, WiFi protocol, LiFi protocol, infrared wireless transmission protocol, etc. In the present embodiment, the specific form of the wireless protocol is not limited. In order to specifically explain the application scenario of the wireless connection method provided in the present embodiment, it may be illustrated by taking a case where the standard wireless protocol may be the Bluetooth protocol as an example. Here, the wireless earphone 10 may be a TWS (True Wireless Stereo) true wireless earphone or a traditional Bluetooth earphone.

Figure 3:
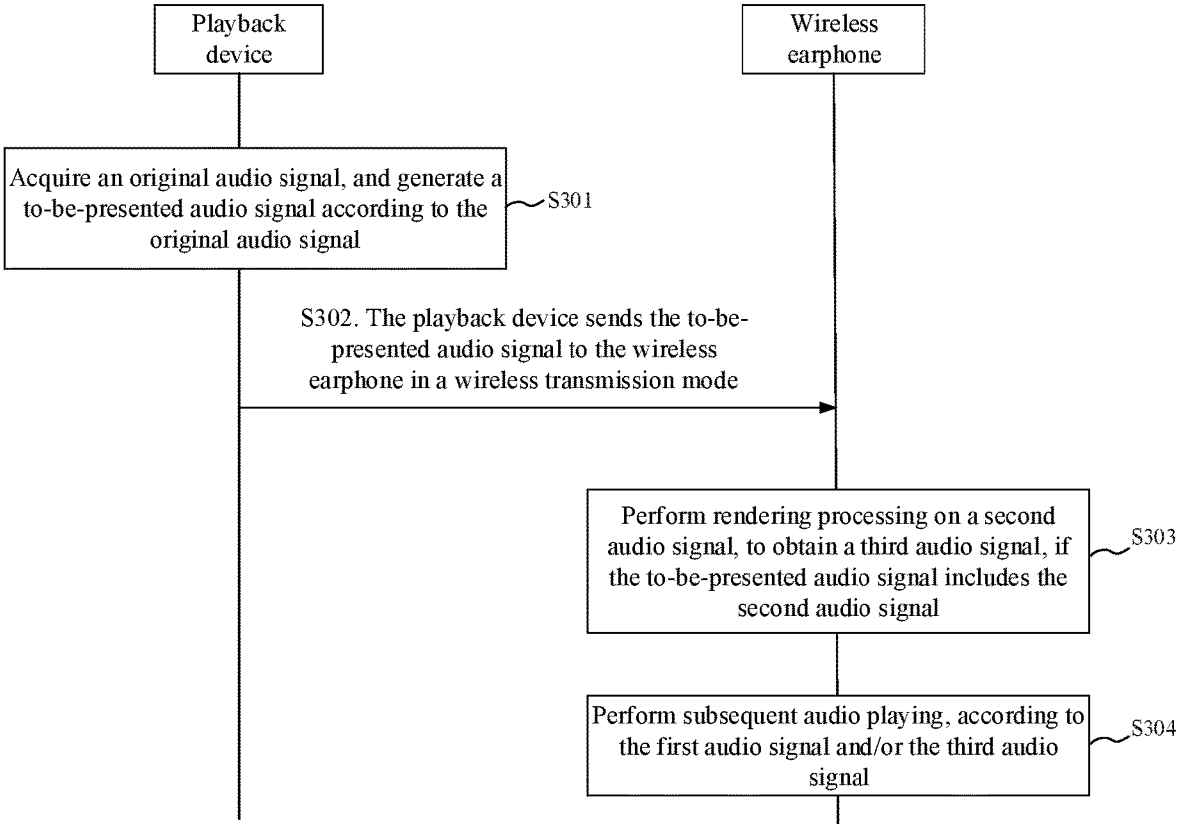
FIG. 3 is a flowchart of an audio processing method according to an exemplary embodiment of the present disclosure.

FIG. 3 is a flowchart of an audio processing method according to an exemplary embodiment of the present disclosure. As illustrated in FIG. 3, the audio processing method provided by the present embodiment includes steps as follows.

S301, an original audio signal is acquired, and a to-be-presented audio signal is generated according to the original audio signal.

In this step, the playback device acquires the original audio signal, and performs pre-processing on the original audio signal. The pre-processing may include at least one pre-processing program, such as a decoding, rendering, and re-encoding.

In an implementation, after the playback device acquires the original audio signal, it may decode all or part of the original audio signal, to obtain audio content data and audio characteristic information. The audio content data may include, but is not limited to, channel content audio signals. The audio characteristic information may include, but is not limited to, a sound field type, a sampling rate and bit rate information, etc.

The original audio signal includes: a channel-based audio signal, such as an AAC/AC3 code stream; an object-based audio signal, such as an ATMOS/MPEG-H code stream; a scene-based audio signal, such as an MPEG-H HOA code stream, or any combination of the above three audio signals, such as a WANOS code stream.

When the original audio signal is a channel-based audio signal such as an AAC/AC3 code stream, the audio code stream is fully decoded, to obtain audio content signals of individual channels, and channel characteristic information, such as the sound field type, sampling rate, and bit rate.

When the original audio signal is an object-based audio signal such as an ATMOS/MPEG-H code stream, only an audio bed is decoded, to obtain the audio content signals of individual channels, and channel characteristic information, such as the sound field type, sampling rate, and bit rate.

When the original audio signal is a scene-based audio signal such as an MPEG-H HOA code stream, the audio code stream is fully decoded, to obtain the audio content signals of individual channels, and channel characteristic information, such as the sound field type, sampling rate, and bit rate.

When the original audio signal is a code stream based on the above three signals, such as a WANOS code stream, the audio code stream is decoded according to a code stream decoding description of the above three signals, to obtain the audio content signals of individual channels, and channel characteristic information, such as the sound field type, sampling rate, and bit rate.

In an implementation, the playback device may perform rendering processing on the decoded audio content data, to obtain a rendered audio signal and metadata. The audio content may include, but is not limited to, audio content signals of channels and audio content signals of objects. The metadata may include, but is not limited to: the channel characteristic information, such as the sound field type, sampling rate, and bit rate; three-dimensional spatial information of the objects; and rendering metadata of a wireless earphone, it may for example include, but is not limited to, sensor metadata and an HRTF (Head Related Transfer Function) database.

Figure 4:
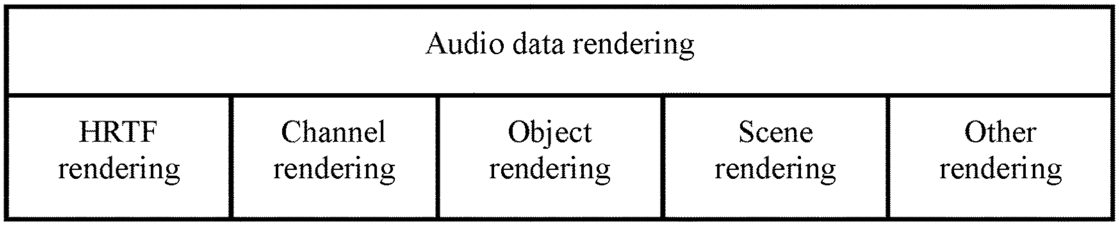
FIG. 4 is a schematic diagram illustrating a rendering mode included in an audio data rendering module as provided by the embodiments of the present disclosure.

FIG. 4 is a schematic diagram illustrating rendering modes included in an audio data rendering module as provided by the embodiment of this disclosure. In the present embodiment, the rendering modes, as shown in FIG. 4, include but are not limited to any combination of the following rendering methods: HRTF rendering, channel rendering, object rendering, scene rendering, etc.

Figure 5:
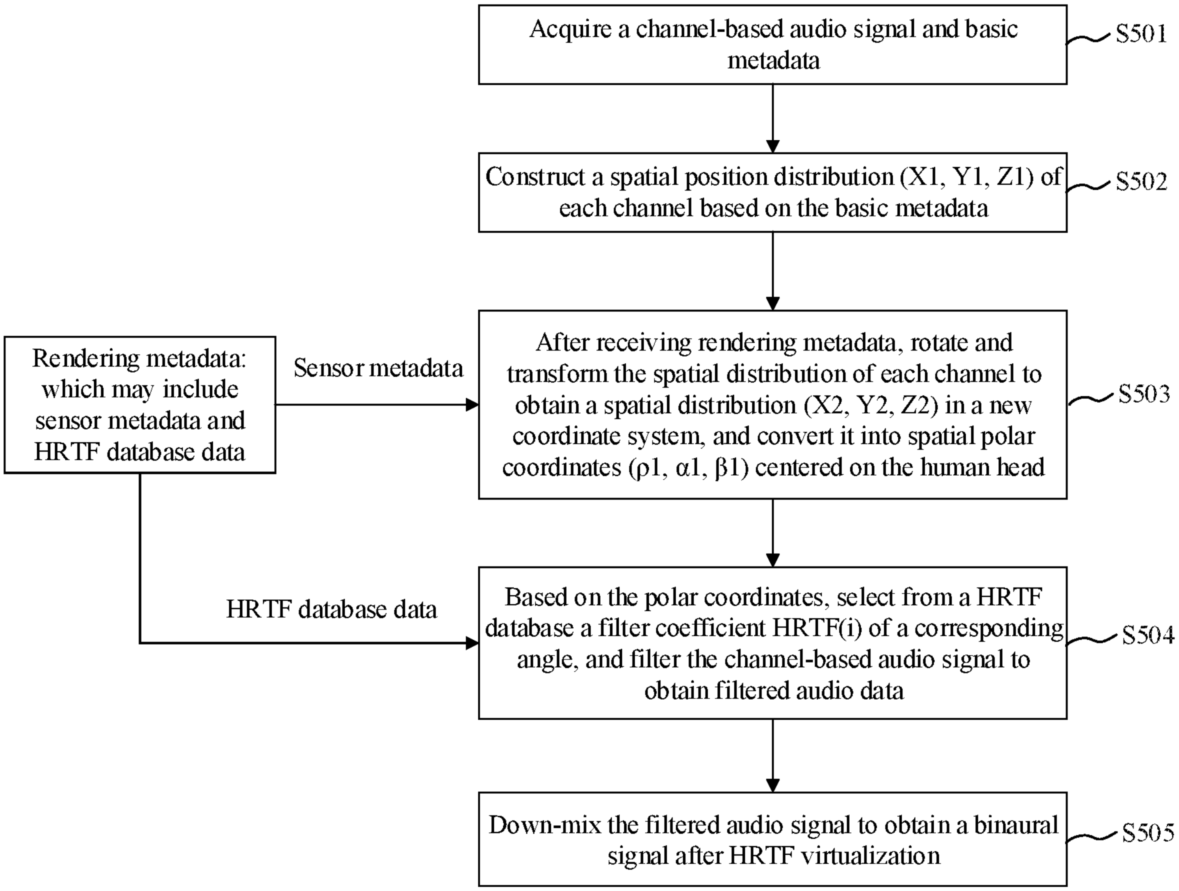
FIG. 5 is a flowchart of an HRTF rendering method provided by an embodiment of the present disclosure.

FIG. 5 is a flowchart of an HRTF rendering method provided by the embodiment of the present disclosure. As shown in FIG. 5, when the decoded audio signal is a channel signal, the rendering method include specific steps as follows.

S501, a channel-based audio signal and basic metadata are acquired.

In this step, the channel-based audio signal is a content signal of the channels, which includes the number of the channels; and the basic metadata is basic information of the channels, including information such as the sound field type and sampling rate.

S502, a spatial position distribution (X1, Y1, Z1) of each channel is constructed based on the basic metadata.

In this step, the spatial distribution of each channel is constructed with the basic metadata and according to a preset algorithm.

S503, after the rendering metadata is received, the spatial distribution of each channel is rotated and transformed to obtain a spatial distribution (X2, Y2, Z2) in a new coordinate system, and it is converted into a spatial polar coordinates (ρ1, α1, β1) centered on the human head.

In this step, the sensor metadata of the rendering metadata that is from a sensor is received, and the spatial distribution of each channel is rotated. The specific coordinate conversion is calculated according to the conversion between the general Cartesian coordinate system and a polar coordinate system, which is not repeated here.

S504, based on the polar coordinates, a filter coefficient HRTF(i) of a corresponding angle is selected from a HRTF database, to filter the channel-based audio signal, obtaining filtered audio data.

In this step, according to distance and angle information from the polar coordinates (ρ1, α1, β1), a corresponding filter array HRTF(i) is selected from data of the HRTF database, and then the audio signals of individual channels are filtered therewith.

S505, down-mixing processing is performed on the filtered audio data, to obtain a binaural signal after HRTF virtualization.

In this step, the down-mixing processing is performed on the filtered audio data, and then audio signals of the left and right wireless earphones, i.e., the binaural signal, can be acquired.

It should be noted that the sensor metadata may be provided by a combination of a gyroscope sensor, a geomagnetic device and an accelerometer. The HRTF database may be based on, but not limited to, other sensor metadata on the wireless earphone, such as the head size sensor. Alternatively, after intelligent recognition is performed based on a front-end device with a camera or photo-taking function, and personalized processing and adjustment are carried out according to the physical characteristics of the listener's head, ears, etc., the HRTF database can achieve a personalized effect. The HRTF database may be stored in the wireless earphone in advance, or a new HRTF database may be imported into it in a wired or wireless way to update the HRTF database, so as to achieve the purpose of personalization.

It should also be noted that, due to a limited accuracy of the HRTF database, interpolation may be considered during calculation, to obtain an HRTF data set of the corresponding angle; in addition, subsequent processing steps may be further added after S505, including but not limited to equalization (EQ), delay, reverberation and other processing.

Figure 6:
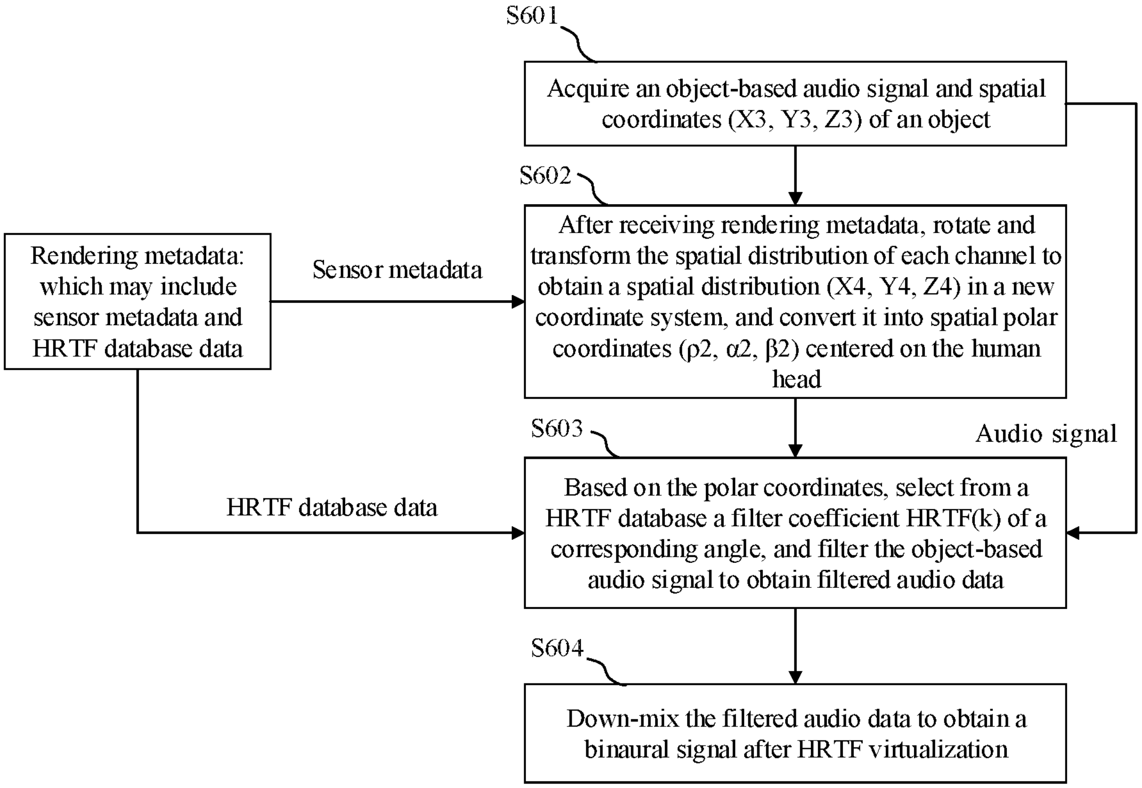
FIG. 6 is a flowchart of another HRTF rendering method provided by an embodiment of the present disclosure.

FIG. 6 is a flowchart of another HRTF rendering method provided by the embodiment of this disclosure. As shown in FIG. 6, when the decoded audio signal is an object signal, the rendering method include specific steps as follows.

S601, an object-based audio signal and spatial coordinates (X3, Y3, Z3) of an object are acquired.

S602, after the rendering metadata is received, the spatial distribution of each channel is rotated and transformed to obtain a spatial distribution (X4, Y4, Z4) in a new coordinate system, and it is converted into spatial polar coordinates (ρ2, α2, β2) centered on the human head.

S603, based on the polar coordinates, a filter coefficient HRTF(k) of a corresponding angle is selected from the HRTF database, to filter the object-based audio signal, obtaining filtered audio data.

S604, down-mixing processing is performed on the filtered audio data, to obtain a binaural signal after HRTF virtualization.

The steps and noun concepts of S601-S604 are similar to those of S501-S505, which may be understood by making reference thereto, and will not be repeated here.

For the channel rendering shown in FIG. 4, the playback device may perform the rendering processing on all or part of the channel audio signals, where such processing includes but not limited to down-mixing on the number of channels (for example, 7.1 is down-mixed to 5.1) and down-mixing on the dimension of a channel (for example, 5.1.4 is down-mixed to 5.1).

For the object rendering shown in FIG. 4, the playback device may perform the rendering processing on all or part of the input object audio signal, and according to the metadata of the object, render the object audio content to a specified position and a specified number of channels, to make it become a channel audio signal.

For the scene rendering shown in FIG. 4, the playback device may perform the rendering processing on all or part of the input scene audio signal, and according to the specified numbers of input channels and the specified numbers of output channels, render the scene audio signal to a specified output channel, to make it become a channel audio signal.

Furthermore, in an implementation, the playback device may re-encode the rendered audio data and the rendered metadata, and output an encoded audio code stream as the to-be-presented audio signal for transmission to the wireless earphone wirelessly.

S302, the playback device sends the to-be-presented audio signal to the wireless earphone in a wireless transmission mode.

In this step, the to-be-presented audio signal includes a first audio signal and/or a second audio signal. The first audio signal is an audio signal that has undergone the rendering processing performed by the playback device, and the second audio signal is an audio signal that is to be rendered.

It should be noted that, the first audio signal is an audio signal for which the rendering processing has been completed in the playback device, while the second audio signal is a signal for which no rendering processing is performed by the playback device, and it requires further rendering processing by the earphone.

Specifically, in a possible design, if the to-be-presented audio signal includes only the first audio signal, the wireless earphone directly plays the first audio signal. Because some high-quality sound source data, such as lossless music, itself already has a high sound quality or already contains a corresponding rendering effect, there is no need for the earphone to perform further rendering processing. Furthermore, in some application scenarios, the user rarely makes violent head movements when using the wireless earphone, which does not have a high demand for rendering; in this case, there is no need for the wireless earphone to perform the rendering processing.

In a possible design, if the to-be-presented audio signal includes the second audio signal, the wireless earphone needs to perform S303 rendering on the second audio signal.

It should be noted that the purpose of the rendering processing is to enable a sound to present a stereo surround sound effect and an Atmos effect, to increase the sense of sound space, and to simulate the effect that people can get from the sound the sense of sound orientation, for example, it enables to identify the coming or going of a vehicle, and whether the car is approaching or leaving at a high speed.

Furthermore, in a possible design, the wireless earphone receives, in a wireless transmission mode, the to-be-presented audio signal sent by the playback device; and when the to-be-presented audio signal is a compressed code stream, the wireless earphone decodes the to-be-presented audio signal, to obtain the first audio signal and/or the second audio signal. That is, the to-be-presented audio signal needs to be decoded, to obtain the first audio signal and/or the second audio signal.

It should be noted that the decoded first audio signal or second audio signal includes audio content data and audio characteristic information. The audio content data may include but is not limited to a channel content audio signal, and the audio characteristic information may include, but is not limited to, the sound field type, sampling rate, bit rate information, etc.

It should also be noted that the wireless transmission mode includes Bluetooth communication, infrared communications, WIFI communication and LIFI visible light communication. Those skilled in the art may choose a specific wireless transmission mode according to the actual situation, which is not limited to the above situations; or may choose several wireless transmission modes to combine with each other, to achieve an effect of information interaction between the playback device and the wireless earphone.

S303, if the to-be-presented audio signal includes the second audio signal, the rendering processing is performed on the second audio signal, to obtain a third audio signal.

In this step, the to-be-presented audio signal including the second audio signal, means that the to-be-presented audio signal includes only the second audio signal, or both the first audio signal and the second audio signal exist in the to-be-presented audio signal.

Figure 7:
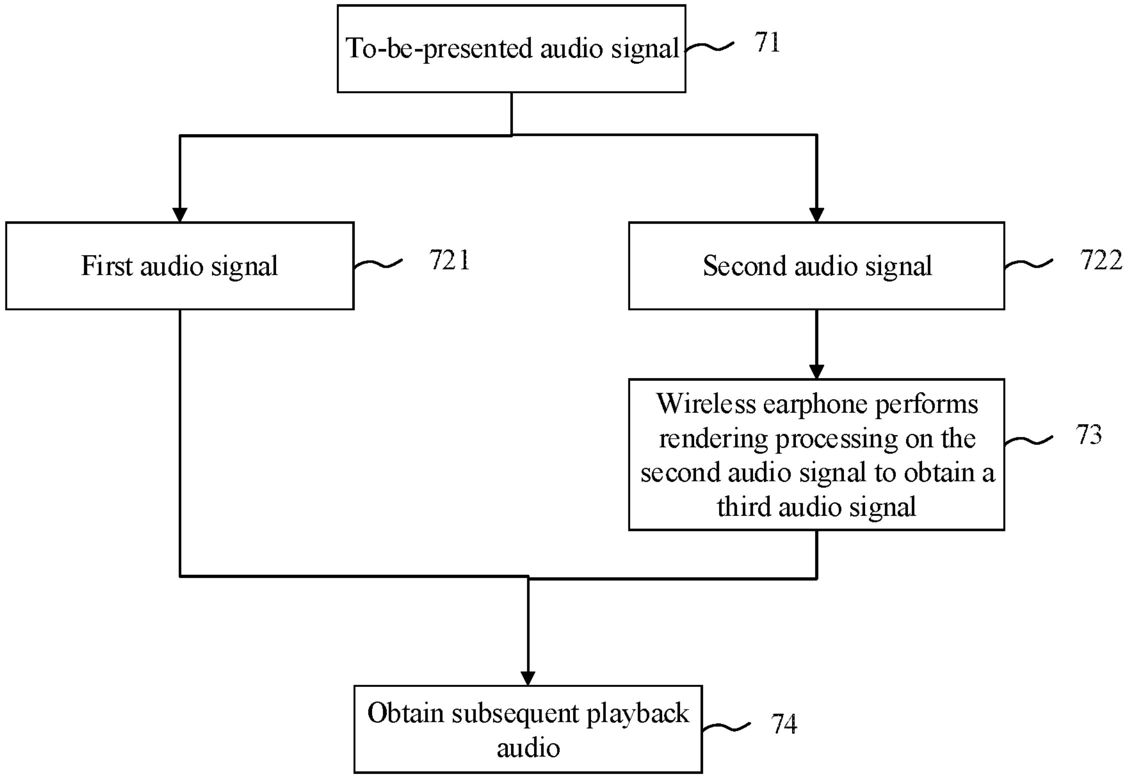
FIG. 7 is a data flow diagram illustrating audio signal rendering at a wireless earphone as provided by the embodiment of the present disclosure.

FIG. 7 is a data flow diagram illustrating audio signal rendering at the wireless earphone as provided by the embodiment of the present disclosure. As shown in FIG. 7, the to-be-presented audio signal 71 includes at least one of the first audio signal 721 and the second audio signal 722, and the second audio signal 722 must be rendered 73 by the wireless earphone before it can be played as a subsequent playback audio 74 or as part of the subsequent playback audio 74.

It should be noted that the rendering processing by the playback device and the wireless earphone in the present embodiment includes at least one of binaural virtual rendering, channel signal rendering, object signal rendering and scene signal rendering.

When the wireless earphone is a traditional wireless Bluetooth earphone, that is, the two earphones are connected by a wire and share the related sensors, processing units, etc.; in this case, the rendering thereof is as follows.

The second audio signal contains audio content data and audio characteristic information, and the audio content is rendered to obtain the rendered audio signal and metadata. The audio content may include, but is not limited to, audio content signals of channels and audio content signals of objects. The metadata may include, but is not limited to: channel characteristic information, such as the sound field type, sampling rate, and bit rate; three-dimensional spatial information of the objects; and rendering metadata of the wireless earphone, it may for example include, but is not limited to, sensor metadata and HRTF database.

The specific rendering process is the same as the rendering of the playback device in principle. Reference may be made to the HRTF rendering shown in FIG. 5 and FIG. 6, and other rendering methods of the playback device introduced in S302.

In an implementation, the performing rendering processing on the second audio signal to obtain the third audio signal includes:

performing the rendering processing on the second audio signal according to rendering metadata, to obtain the third audio signal, where the rendering metadata includes first metadata and second metadata, the first metadata is metadata at a side of the playback device, and the second metadata is metadata at a side of the wireless earphone.

The metadata is information that describes data attributes. The first metadata is used to indicate a current motion state of the playback device, a signal transmission intensity of the playback device, a signal propagation direction, a distance or a relative motion state between the playback device and the wireless earphone, etc. The second metadata is used to indicate a motion state of the wireless earphone. For example, if a person's head is swinging or shaking, the wireless earphone will be caused to move along with it. The second metadata data may also contain information such as a relative motion distance, a relative motion speed and an acceleration of the left and right wireless earphones. The first metadata and the second metadata together provide a rendering basis for achieving a high-quality surround sound or an Atmos effect. For example, when using a virtual reality device to play a first-person shooting game, the user needs to listen to determine whether there is an enemy approaching, or determine the enemy's position based on the sound of the nearby gunfight, while turning his/her head left and right for observation. In order to render the ambient sound more truly, it is necessary to provide the wireless earphones and/or the playback device with the second metadata of the wireless earphones and the first metadata of the playback device worn by the user or placed in the room, to render the original audio data comprehensively, so as to achieve a realistic and high-quality sound playing effect.

In a possible implementation, the first metadata includes first sensor metadata, where the first sensor metadata is used to characterize a motion characteristic of the playback device; and/or the second metadata includes second sensor metadata and a head related transfer function HRTF database, where the second sensor metadata is used to characterize a motion characteristic of the wireless earphone.

Specifically, the first metadata may be detected by a first sensor, and the first sensor may be located on the playback device, the wireless earphone, or other objects worn by the user, such as a smart bracelet or a smart watch. As shown in FIG. 5, in the audio signal rendering stage of the playback device, the first metadata is the sensor metadata in FIG. 5; in the audio signal rendering stage of the wireless earphone, the second sensor metadata is the sensor metadata in FIG. 5; and the head related transfer function HRTF database is the HRTF database data in FIG. 5. That is, the first metadata is used for the rendering of the playback device, and the second metadata is used for the rendering of the wireless earphone.

In an implementation, the first sensor metadata is acquired by a first sensor, and the first sensor includes at least one of a gyroscope sensor, a head size sensor, a ranging sensor, a geomagnetic sensor and an acceleration sensor; and/or the metadata of the second sensor is acquired by a second sensor, and the second sensor includes at least one of a gyroscope sensor, a head size sensor, a ranging sensor, a geomagnetic sensor and an acceleration sensor.

In a possible design, the wireless earphone includes a first wireless earphone and a second wireless earphone;

the first wireless earphone or the second wireless earphone is provided with the second sensor; or each of the first wireless earphone and the second wireless earphone is provided with the second sensor, and the first wireless earphone and the second wireless earphone synchronize the second sensor metadata therebetween after respectively acquiring the second sensor metadata.

S304, subsequent audio playing is performed according to the first audio signal and/or the third audio signal.

In this step, the wireless earphone plays the first audio signal and/or the third audio signal. Specifically, when only the first audio signal is included, that is, the to-be-presented audio signal transmitted by the playback device does not need to be rendered in the wireless earphone, it can be directly played by the wireless earphone. When only the third audio signal is included, that is, the to-be-presented audio signal transmitted by the playback device all need to be rendered in the wireless earphone to obtain the third audio signal, and then it can be played by the wireless earphone. When both the first audio signal and the third audio signal are included, the wireless earphone needs to combine them according to a preset combination algorithm, and then play the combined audio signal. In this disclosure, the combination algorithm is not limited, and those skilled in the art can choose an appropriate implementation of the combination algorithm according to specific application scenarios.

This embodiment provides an audio processing method. Firstly, a wireless earphone receives a to-be-presented audio signal sent by a playback device in a wireless transmission mode, and the to-be-presented audio signal includes an audio signal that has undergone rendering processing performed by the playback device, namely a first audio signal, and includes an audio signal that is to be rendered, namely a second audio signal. Then, if the to-be-presented audio signal includes the second audio signal, the wireless earphone performs rendering processing on the second audio signal, to obtain a third audio signal. Finally, the wireless earphone performs subsequent audio playing according to the first audio signal and/or the third audio signal. In this way, it enables technical effects that the wireless earphone can present a high-quality surround sound and an Atmos effect.

Figure 8:
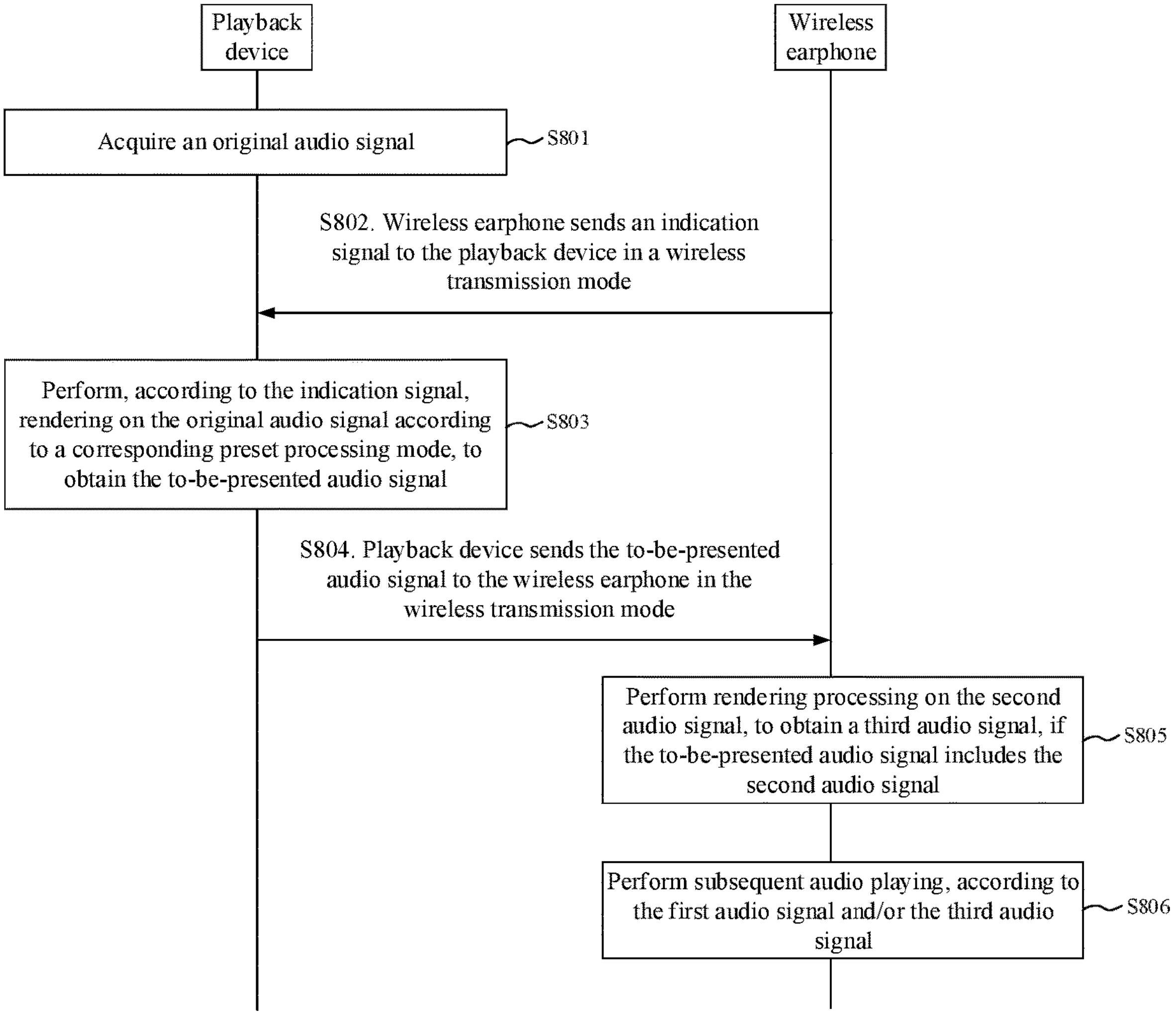
FIG. 8 is a flowchart of another audio processing method provided by an embodiment of the present disclosure.

FIG. 8 is a flowchart of another audio processing method provided by an embodiment of the present disclosure. As illustrated in FIG. 8, the method include specific steps as follows.

S801, an original audio signal is acquired.

In this step, the playback device acquires the original audio signal from an internal memory, database, Internet and other resource libraries.

S802, the wireless earphone sends an indication signal to the playback device in a wireless transmission mode.

In this step, the indication signal is used to instruct the playback device to perform rendering, according to a corresponding preset processing mode, on the original audio signal, to obtain the to-be-presented audio signal. The function of the indication signal is to indicate a rendering processing capability of the wireless earphone. For example, when the wireless earphone itself has sufficient battery power, it has a strong processing capability, and in a handshake stage between the wireless earphone and the playback device, that is, a stage where a wireless connection is established, it sends to the playback device an indication that a high proportion of the rendering task may be assigned to the wireless earphone. When the wireless earphone has low battery, it has a weak processing capacity, or in order to make the wireless earphone keep working for a longer time, that is, in a power-saving mode, the wireless earphone instructs the playback device to allocate a low proportion of the rendering task thereto, or not to allocate the rendering task to the wireless earphone.

In a possible design, the wireless earphone sends a performance parameter of the wireless earphone in the wireless transmission mode. After receiving the performance parameter of the wireless earphone, the playback device may acquire the indication signal by querying a mapping table between performance parameters and indication signals, or calculate, with a preset algorithm, the indication signal according to the performance parameter.

S803, according to the indication signal, rendering is performed on the original audio signal according to the corresponding preset processing mode, to obtain the to-be-presented audio signal.

In a possible design, the indication signal includes an identification code;

where if the identification code is a first field, the playback device does not perform rendering on the original audio signal, the to-be-presented audio signal includes the second audio signal but not the first audio signal, and the wireless earphone performs full rendering on the original audio signal;

if the identification code is a second field, the playback device performs full rendering on the original audio signal, the to-be-presented audio signal includes the first audio signal but not the second audio signal, and the wireless earphone performs no rendering on the original audio signal; and if the identification code is a third field, the playback device performs rendering on a part of the original audio signal, the to-be-presented audio signal includes the first audio signal and the second audio signal, and the wireless earphone performs the rendering on a remaining part of the original audio signal.

The indication information may be sent from the wireless earphone to the playback device when the wireless earphone is connected to the playback device for the first time, so that it does not need to consume the processing resource of the playback device or the wireless earphone later.

It can be understood that the sending of the indication information may also be triggered periodically, so that the indication information may be changed according to different playback contents, and the sound quality of wireless earphone can be dynamically adjusted.

The sending of the indication information may also be triggered according to a user instruction received by a sensor in the wireless earphone.

In order to explain the function of the indication signal, the following description will be made with reference to FIG. 9.

Figure 9:
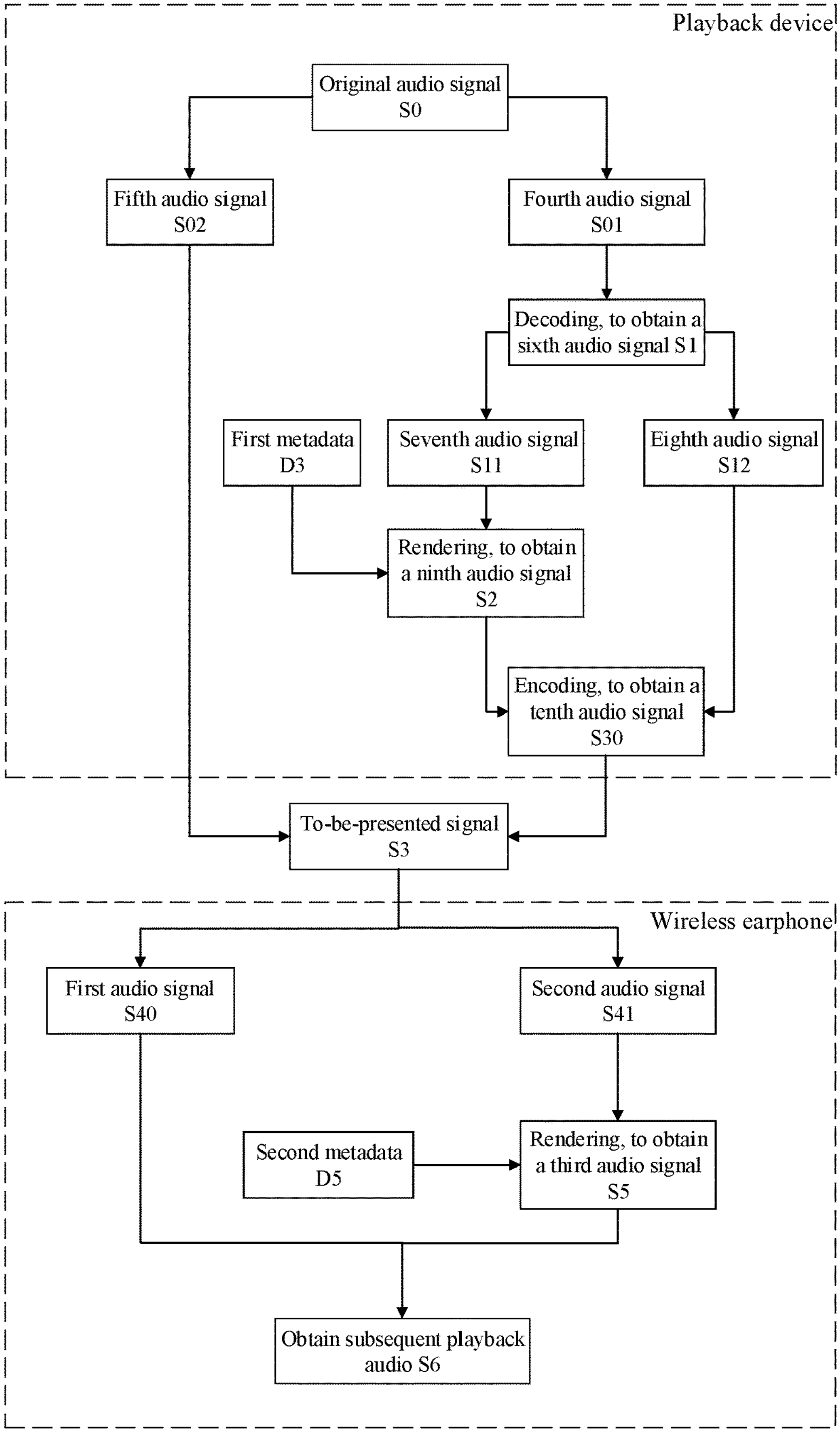
FIG. 9 is a schematic diagram illustrating a data link of the audio processing signal in the playback device and the wireless earphone as provided by an embodiment of the present disclosure.

FIG. 9 is a schematic diagram illustrating a data link of the audio processing signal in the playback device and the wireless earphone as provided by an embodiment of the present disclosure. As shown in FIG. 9, from a time when the playback device acquires the original audio signal S0 to a time when the playback device outputs the to-be-presented signal S3, the function of the indication signal is to guide the data flow direction of the original audio signal S0.

The original audio signal S0 includes a fourth audio signal S01 and/or a fifth audio signal S02, where the fourth audio signal S01 is used to generate, after being processed, the first audio signal S40, and the fifth audio signal S02 is used to generate the second audio signal S41;

after acquiring the original audio signal S0, the playback device performs decoding processing on the fourth audio signal S01, to obtain a sixth audio signal S1, where the sixth audio signal S1 includes a seventh audio signal S11 and/or an eighth audio signal S12;

the rendering processing is performed on the seventh audio signal S11, to obtain a ninth audio signal S2;

encoding processing is performed on the eighth audio signal S12 and the ninth audio signal S2, to obtain a tenth audio signal S30, where the to-be-presented audio signal includes the fifth audio signal S02 and the tenth audio signal s30;

where the performing rendering processing on the seventh audio signal S11 includes:

performing the rendering processing on the seventh audio signal S11 according to rendering metadata, to obtain the ninth audio signal S2, where the rendering metadata includes first metadata D3 and second metadata D5, the first metadata D3 is metadata at a side of the playback device, and the second metadata D5 is metadata at a side of the wireless earphone.

In the audio signal transmission link shown in FIG. 9, there may be multiple data links each from the original audio signal to the subsequent to-be-played audio, or there may be only one data link. The indication signal and/or the original audio signal determine the specific usage of the data link.

S804, the playback device sends the to-be-presented audio signal to the wireless earphone in the wireless transmission mode.

S805, if the to-be-presented audio signal includes the second audio signal, the second audio signal is rendered to obtain a third audio signal.

S806, subsequent audio playing is performed according to the first audio signal and/or the third audio signal.

In this embodiment, steps S804-S805 are similar to steps S302-S304 of the audio processing method shown in FIG. 3, and will not be repeated here.

This embodiment provides an audio processing method. Firstly, a wireless earphone receives a to-be-presented audio signal sent by a playback device in a wireless transmission mode, and the to-be-presented audio signal includes an audio signal that has undergone rendering processing performed by the playback device, namely a first audio signal, and includes an audio signal that is to be rendered, namely a second audio signal. Then, if the to-be-presented audio signal includes the second audio signal, the wireless earphone performs rendering processing on the second audio signal, to obtain a third audio signal. Finally, the wireless earphone performs subsequent audio playing according to the first audio signal and/or the third audio signal. In this way, it enables technical effects that the wireless earphone can present a high-quality surround sound and an Atmos effect.

Figure 10:
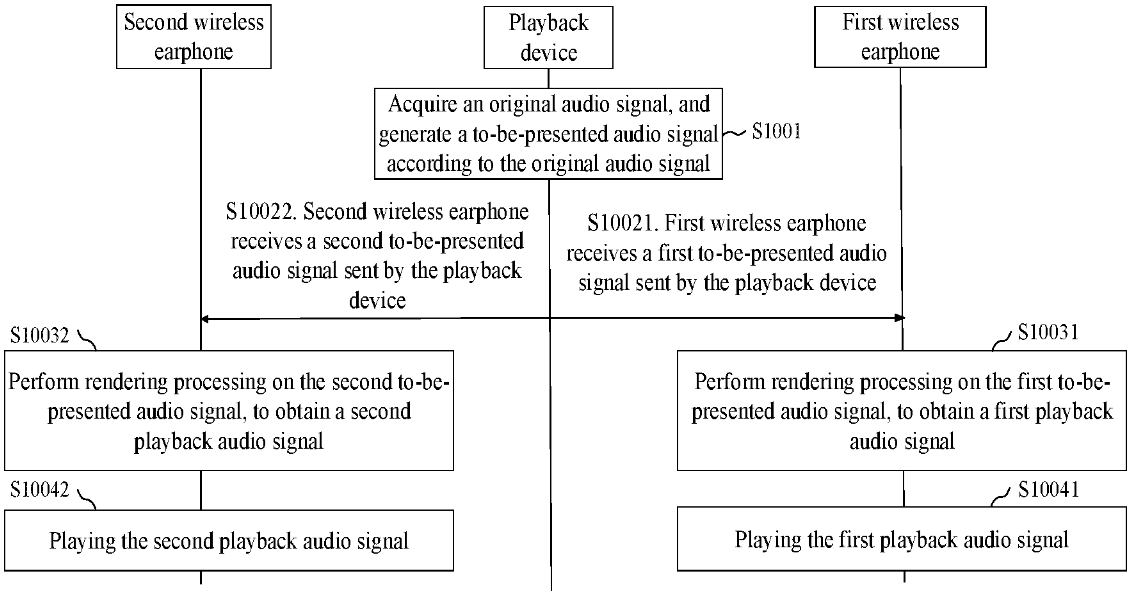
FIG. 10 is a flowchart of another audio processing method provided by an embodiment of the present disclosure.

FIG. 10 is a flowchart of another audio processing method provided by an embodiment of the present disclosure. As shown in FIG. 10, this method include specific steps as follows.

S1001, an original audio signal is acquired, and a to-be-presented audio signal is generated according to the original audio signal.

In this step, the playback device acquires the original audio signal, and the original audio signal may include lossless music, game audio, movie audio, etc. Then, the playback device performs, on the original audio signal, at least one of decoding, rendering, and re-encoding. For the possible implementation of step S1001, reference may be made to the description in S803 regarding the data link distribution of the playback device shown in FIG. 9, which is not repeated here.

S10021, a first wireless earphone receives a first to-be-presented audio signal sent by the playback device.

S10022, a second wireless earphone receives a second to-be-presented audio signal sent by the playback device.

In the present embodiment, the wireless earphone includes the first wireless earphone and the second wireless earphone, where the first wireless earphone and the second wireless earphone are used to establish a wireless connection with the playback device.

It should be noted that S10021 and S10022 may occur simultaneously, and the sequence thereof is not limited.

S10031, the first wireless earphone performs rendering processing on the first to-be-presented audio signal, to obtain a first playback audio signal.

S10032, the second wireless earphone performs rendering processing on the second to-be-presented audio signal, to obtain a second playback audio signal.

It should be noted that S10031 and S10032 may occur simultaneously, and the sequence thereof is not limited.

In an implementation, before S1021, it further includes:

performing decoding processing, by the first wireless earphone, on the first to-be-presented audio signal, to obtain a first decoded audio signal; and correspondingly, the first wireless earphone performing the rendering processing on the first to-be-presented audio signal includes:

performing the rendering processing, by the first wireless earphone, according to the first decoded audio signal and rendering metadata, to obtain the first playback audio signal.

Before S1022, it further includes:

performing decoding processing, by the second wireless earphone, on the second to-be-presented audio signal, to obtain a second decoded audio signal; and correspondingly, the second wireless earphone performing the rendering processing, on the second to-be-presented audio signal includes:

performing the rendering processing, by the second wireless earphone, according to the second decoded audio signal and the rendering metadata, to obtain the second playback audio signal.

In an implementation, the rendering metadata includes at least one of first wireless earphone metadata, second wireless earphone metadata and playback device metadata.

In an implementation, the first wireless earphone metadata includes first earphone sensor metadata and a head related transfer function HRTF database, where the first earphone sensor metadata is used to characterize a motion characteristic of the first wireless earphone.

The second wireless earphone metadata includes second earphone sensor metadata and a head related transfer function HRTF database, where the second earphone sensor metadata is used to characterize a motion characteristic of the second wireless earphone.

The playback device metadata includes playback device sensor metadata, where the playback device sensor metadata is used to characterize a motion characteristic of the playback device.

In an implementation, before the rendering processing is performed, it further includes:

synchronizing the rendering metadata between the first wireless earphone and the second wireless earphone.

In an implementation, if the first wireless earphone is provided with an earphone sensor, the second wireless earphone is not provided with an earphone sensor, and the playback device is not provided with a playback device sensor, the synchronizing the rendering metadata between the first wireless earphone and the second wireless earphone includes:

sending, by the first wireless earphone, the first earphone sensor metadata to the second wireless earphone, and taking, by the second wireless earphone, the first earphone sensor metadata as the second earphone sensor metadata.

If each of the first wireless earphone and the second wireless earphone is provided with the earphone sensor, and the playback device is not provided with a playback device sensor, the synchronizing the rendering metadata between the first wireless earphone and the second wireless earphone includes:

sending, by the first wireless earphone, the first earphone sensor metadata to the second wireless earphone, and sending, by the second wireless earphone, the second earphone sensor metadata to the first wireless earphone; and determining, by each of the first wireless earphone and the second wireless earphone, the rendering metadata, according to the first earphone sensor metadata, the second earphone sensor metadata and a preset numerical algorithm; or sending, by the first wireless earphone, the first earphone sensor metadata to the playback device, and sending, by the second wireless earphone, the second earphone sensor metadata to the playback device, to cause the playback device to determine the rendering metadata, according to the first earphone sensor metadata, the second earphone sensor metadata and a preset numerical algorithm; and receiving, by each of the first wireless earphone and the second wireless earphone, the rendering metadata.

In a possible design, if the first wireless earphone is provided with an earphone sensor, the second wireless earphone is not provided with an earphone sensor, and the playback device is provided with a playback device sensor, then the synchronizing the rendering metadata between the first wireless earphone and the second wireless earphone includes:

sending, by the first wireless earphone, the first earphone sensor metadata to the playback device, to cause the playback device to determine the rendering metadata, according to the first earphone sensor metadata, the playback device sensor metadata and a preset numerical algorithm; and receiving, by each of the first wireless earphone and the second wireless earphone, the rendering metadata; or receiving, by the first wireless earphone, the playback device sensor metadata sent by the playback device; determining, by the first wireless earphone, the rendering metadata, according to the first earphone sensor metadata, the playback device sensor metadata and a preset numerical algorithm; and sending, by the first wireless earphone, the rendering metadata to the second wireless earphone.

In another possible design, if each of the first wireless earphone and the second wireless earphone is provided with an earphone sensor, and the playback device is provided with a playback device sensor, the synchronizing the rendering metadata between the first wireless earphone and the second wireless earphone includes:

sending, by the first wireless earphone, the first earphone sensor metadata to the playback device, and sending, by the second wireless earphone, the second earphone sensor metadata to the playback device, to cause the playback device to determine the rendering metadata, according to the first earphone sensor metadata, the second earphone sensor metadata, the playback device sensor metadata and a preset numerical algorithm; and receiving, by each of the first wireless earphone and the second wireless earphone, the rendering metadata; or sending, by the first wireless earphone, the first earphone sensor metadata to the second wireless earphone, and sending, by the second wireless earphone, the second earphone sensor metadata to the first wireless earphone; receiving, by each of the first wireless earphone and the second wireless earphone, the playback device sensor metadata; and determining, by each of the first wireless earphone and the second wireless earphone, the rendering metadata, according to the first earphone sensor metadata, the second earphone sensor metadata, the playback device sensor metadata and a preset numerical algorithm.

Specifically, when the wireless earphone is the TWS true wireless earphone, that is, the two earphones are separated from each other and coupled therebetween wirelessly, the two earphones may each have their own processing units and sensors, etc. Then, the first wireless earphone is the left earphone and the second wireless earphone is the right earphone. In this case, the synchronous rendering mode of the first wireless earphone and the second wireless earphone is as follows.

Figure 11:
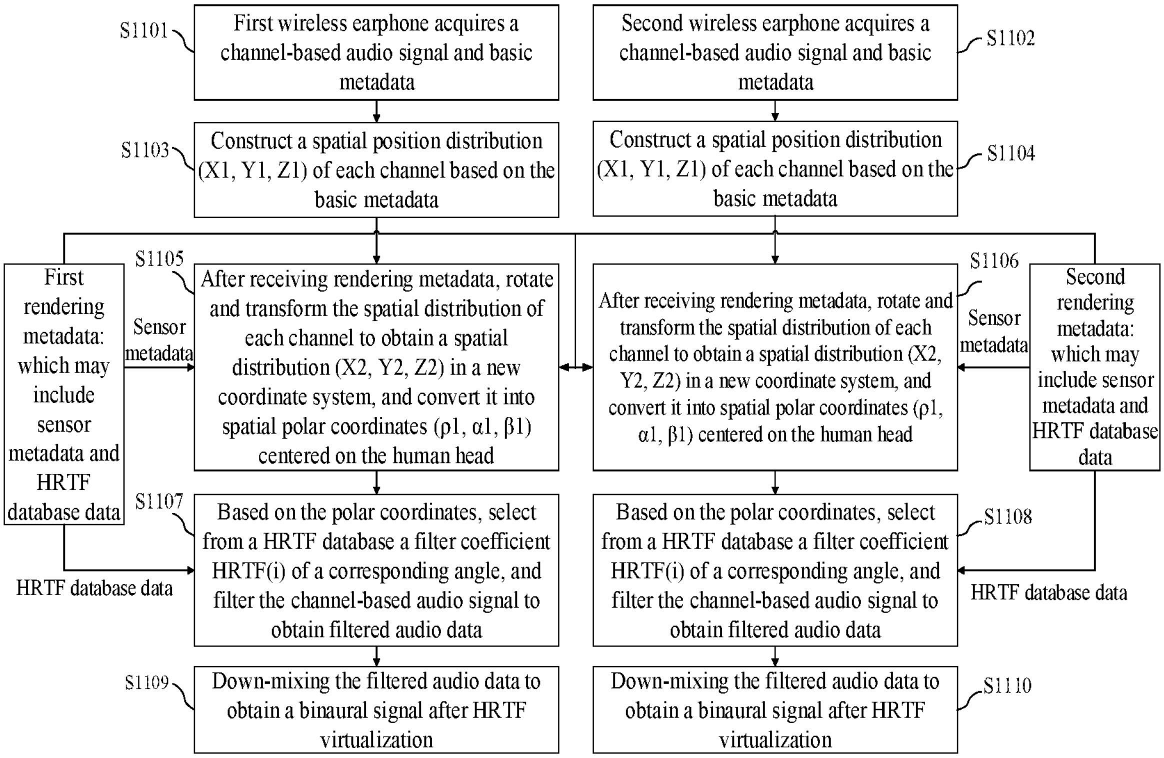
FIG. 11 is a schematic diagram illustrating a rendering process of a TWS true wireless earphone for channel information as provided by an embodiment of the present disclosure.

FIG. 11 is a schematic diagram of a rendering process of a TWS true wireless earphone for channel information as provided by an embodiment of the present disclosure.

As for the description of steps S1101-S1110, reference may be made to the HRTF rendering method illustrated in FIG. 4, which will not be repeated here. It should be noted that the sensor metadata of the first wireless earphone and the sensor metadata of the second wireless earphone may cooperate with each other to adjust the data synchronization of the two earphones, so as to achieve a better sound effect.

S10041, the first wireless earphone plays the first playback audio signal.

S10042, the second wireless earphone plays the second playback audio signal.

It should be noted that S10041 and S10042 may occur simultaneously, and the sequence thereof is not limited.

In a possible design, the to-be-presented audio signal includes at least one of a channel-based audio signal, an object-based audio signal and a scene-based audio signal.

It should be noted that the rendering processing includes at least one of binaural virtual rendering, channel signal rendering, object signal rendering and scene signal rendering.

It should also be noted that the wireless transmission mode includes Bluetooth communication, infrared communication, WIFI communication and LIFI visible light communication.

In addition, in a possible design, one playback device may also be connected to multiple pairs of wireless earphones at the same time. In this case, rendering of the audio information may still be allocated among the multiple pairs of wireless earphones with reference to the way of the above embodiment, and different ratios of rendering allocation between the playback device and the wireless earphone may be matched correspondingly according to the varied processing capabilities of different wireless earphones. In an implementation, the multiple pairs of wireless earphones may also make the resources for rendering processing among the individual pairs of wireless earphones comprehensively scheduled by means of the playback device; that is, for a wireless earphone with a weak processing capability, the rendering of the audio information may be assisted by invoking other wireless earphones with strong processing capability connected with the same playback device.

This embodiment provides an audio processing method. Firstly, a first wireless earphone and a second wireless earphone receive respectively, in a wireless transmission mode, a first to-be-presented audio signal and a second to-be-presented audio signal that are sent by a playback device. Then, the first and second wireless earphone perform respective rendering processing thereon respectively, to obtain a first playback audio signal and a second playback audio signal. Finally, the first and second wireless earphone play their respective playback audio signals, respectively. In this way, it enables technical effects that the delay caused by interaction of rendered data between the wireless headphones and the playback device is reduced and the sound effect of headphones is improved.

Figure 12:
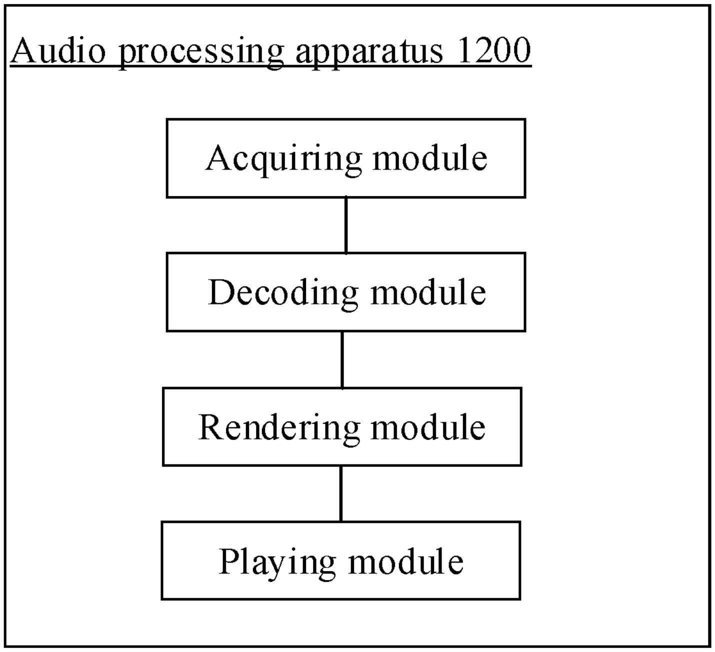
FIG. 12 is a schematic structural diagram of an audio processing apparatus provided by an embodiment of the present disclosure.

FIG. 12 is a schematic structural diagram of an audio processing apparatus provided by an embodiment of the present disclosure. As illustrated in FIG. 12, the audio processing apparatus 1200 provided by the embodiment includes:

an acquiring module, configured to receive a to-be-presented audio signal sent by a playback device in a wireless transmission mode, where the to-be-presented audio signal includes a first audio signal and/or a second audio signal, the first audio signal is an audio signal that has undergone rendering processing performed by the playback device, and the second audio signal is an audio signal that is to be rendered;

a rendering module, configured to perform the rendering processing on the second audio signal, to obtain a third audio signal, when the to-be-presented audio signal includes the second audio signal; and a playing module, configured to perform subsequent audio playing, according to the first audio signal and/or the third audio signal.

In a possible design, before the receiving module receives the to-be-presented audio signal sent by the playback device in the wireless transmission mode, it further includes:

a sending module, configured to send an indication signal to the playback device in the wireless transmission mode, where the indication signal is used to instruct the playback device to perform rendering processing on an original audio signal according to a corresponding preset processing mode, to obtain the to-be-presented audio signal.

In a possible design, before the sending module sends the indication signal to the playback device in the wireless transmission mode, the acquiring module is further configured to acquire a performance parameter of the wireless earphone, and determine the indication signal according to the performance parameter.

In a possible design, before the sending module sends the indication signal to the playback device in the wireless transmission mode, the acquiring module is further configured to receive audio characteristic information sent by the playback device, where the audio characteristic information includes a characteristic parameter of the original audio signal input to the playback device, and the characteristic parameter includes at least one of a code stream format, a channel parameter, an object parameter and a scene component parameter.

In a possible design, the indication signal includes an identification code;

where if the identification code is a first field, the playback device does not perform rendering on the original audio signal, the to-be-presented audio signal includes the second audio signal but not the first audio signal, and the audio processing apparatus performs full rendering on the original audio signal;

if the identification code is a second field, the playback device performs the full rendering on the original audio signal, the to-be-presented audio signal includes the first audio signal but not the second audio signal, and the audio processing apparatus performs no rendering on the original audio signal; and if the identification code is a third field, the playback device performs rendering on a part of the original audio signal, the to-be-presented audio signal includes the first audio signal and the second audio signal, and the audio processing apparatus performs rendering on a remaining part of the original audio signal.

In a possible design, after the acquiring module receives the to-be-presented audio signal sent by the playback device in the wireless transmission mode, it further includes:

a decoding module, configured to decode the to-be-presented audio signal, to obtain the first audio signal and/or the second audio signal.

In a possible design, the rendering module is specifically configured to:

perform the rendering processing on the second audio signal according to rendering metadata, to obtain the third audio signal, where the rendering metadata includes first metadata and second metadata, the first metadata is metadata at a side of the playback device, and the second metadata is metadata at a side of the wireless earphone.

In a possible design, the first metadata includes first sensor module metadata, where the first sensor module metadata is used to characterize a motion characteristic of the playback device; and/or the second metadata includes second sensor module metadata and a head related transfer function HRTF database, where the second sensor module metadata is used to characterize a motion characteristic of the wireless earphone.

In a possible design, the first sensor module metadata is acquired by a first sensor module, and the first sensor module includes at least one of a gyroscope sensor sub-module, a head size sensor sub-module, a ranging sensor sub-module, a geomagnetic sensor sub-module and an acceleration sensor sub-module; and/or the second sensor module metadata is acquired by a second sensor module, and the second sensor module includes at least one of a gyroscope sensor sub-module, a head size sensor sub-module, a ranging sensor sub-module, a geomagnetic sensor sub-module and an acceleration sensor sub-module.

In a possible design, the audio processing apparatus includes a first audio processing apparatus and a second audio processing apparatus;

the first audio processing apparatus or the second audio processing apparatus is provided with the second sensor module; or each of the first audio processing apparatus and the second audio processing apparatus is provided with the second sensor module, and after the acquiring module of the first audio processing apparatus and the acquiring module of the second audio processing apparatus acquire the playback device sensor metadata, each of the apparatuses further includes:

a synchronization module, configured to synchronize the playback device sensor metadata therebetween.

In a possible design, the first audio processing apparatus includes:

a first receiving module, configured to receive a first to-be-presented audio signal sent by the playback device;

a first rendering module, configured to perform rendering processing on the first to-be-presented a audio signal, to obtain a first playback audio signal; and a first playing module, configured to play the first playback audio signal.

The second audio processing apparatus includes:

a second receiving module, configured to receive a second to-be-presented audio signal sent by the playback device;

a second rendering module, configured to perform rendering processing on the second to-be-presented audio signal, to obtain a second playback audio signal; and a second playing module, configured to play the second playback audio signal.

In a possible design, the first audio processing apparatus further includes:

a first decoding module, configured to perform decoding processing on the first to-be-presented audio signal, to obtain a first decoded audio signal; and the first rendering module is specifically configured to perform the rendering processing according to the first decoded audio signal and the rendering metadata, to obtain the first playback audio signal.

The second audio processing apparatus further includes:

a second decoding module, configured to perform decoding processing on the second to-be-presented audio signal, to obtain a second decoded audio signal; and the second rendering module is specifically configured to perform the rendering processing according to the second decoded audio signal and the rendering metadata, to obtain the second playback audio signal.

In a possible design, the rendering metadata includes at least one of first wireless earphone metadata, second wireless earphone metadata and playback device metadata.

In a possible design, the first wireless earphone metadata includes first earphone sensor metadata and a head related transfer function HRTF database, where the first earphone sensor metadata is used to characterize a motion characteristic of the first wireless earphone.

The second wireless earphone metadata includes a second earphone sensor metadata and a head related transfer function HRTF database, where the second earphone sensor metadata is used to characterize a motion characteristic of the second wireless earphone.

The playback device metadata includes playback device sensor metadata, where the playback device sensor metadata is used to characterize a motion characteristic of the playback device.

In a possible design, the first audio processing apparatus further includes:

a first synchronization module, configured to synchronize the rendering metadata with the second wireless earphone; and/or the second audio processing apparatus further includes:

a second synchronization module, configured to synchronize the rendering metadata with the first wireless earphone.

In a possible design, the first synchronization module is specifically configured to send the first earphone sensor metadata to the second wireless earphone, so that the second synchronization module takes the first earphone sensor metadata as the second earphone sensor metadata.

In a possible design, the first synchronization module is specifically configured to:

send the first earphone sensor metadata;

receive the second earphone sensor metadata; and determine the rendering metadata, according to the first earphone sensor metadata, the second earphone sensor metadata and a preset numerical algorithm; and the second synchronization module is specifically configured to:

send the second earphone sensor metadata;

receive the first earphone sensor metadata; and determine the rendering metadata, according to the first earphone sensor metadata, the second earphone sensor metadata and a preset numerical algorithm.

Alternatively, the first synchronization module is specifically configured to:

send the first earphone sensor metadata; and receive the rendering metadata; and the second synchronization module is specifically configured to:

send the second earphone sensor metadata; and receive the rendering metadata.

In a possible design, the first synchronization module is specifically configured to:

receive the playback device sensor metadata;

determine the rendering metadata, according to the first earphone sensor metadata, the playback device sensor metadata and a preset numerical algorithm; and send the rendering metadata.

In a possible design, the first synchronization module is specifically configured to:

send the first earphone sensor metadata;

receive the second earphone sensor metadata;

receive the playback device sensor metadata; and determine the rendering metadata, according to the first earphone sensor metadata, the second earphone sensor metadata, the playback device sensor metadata and a preset numerical algorithm.

The second synchronization module is specifically configured to:

send the second earphone sensor metadata;

receive the first earphone sensor metadata;

receive the playback device sensor metadata; and determine the rendering metadata, according to the first earphone sensor metadata, the second earphone sensor metadata, the playback device sensor metadata and a preset numerical algorithm.

In an implementation, the to-be-presented audio signal includes at least one of a channel-based audio signal, an object-based audio signal and a scene-based audio signal.

In an implementation, the rendering processing includes at least one of binaural virtual rendering, channel signal rendering, object signal rendering and scene signal rendering.

In an implementation, the wireless transmission mode includes Bluetooth communication, infrared communication, WIFI communication and LIFI visible light communication.

It is worth noting that the audio processing apparatus provided by the embodiment shown in FIG. 12 may implement the method corresponding to the wireless earphone as provided by any of the above-mentioned method embodiments, and its specific implementation principle, technical features, explanation of technical terms and technical effects are similar, which will not be repeated here.

Figure 13:
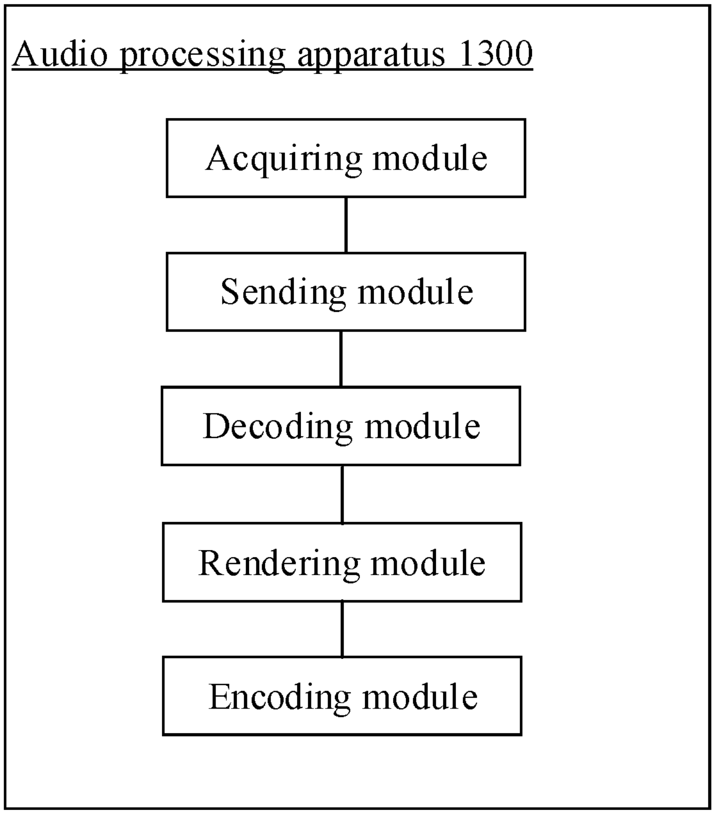
FIG. 13 is a structural schematic diagram of another audio processing apparatus provided by an embodiment of the present disclosure.

FIG. 13 is a structural schematic diagram of another audio processing apparatus provided by an embodiment of the present disclosure. As illustrated in FIG. 13, the audio processing apparatus 1300 provided by the embodiment includes:

an acquiring module, configured to receive an original audio signal, and generate a to-be-presented audio signal according to the original audio signal, where the to-be-presented audio signal includes a first audio signal and/or a second audio signal, the first audio signal is an audio signal that has undergone rendering processing performed by a playback device, and the second audio signal is an audio signal that is to be rendered; and a sending module, configured to send the to-be-presented audio signal to a wireless earphone in a wireless transmission mode.

In a possible design, before the sending module sends the to-be-presented audio signal to the wireless earphone in the wireless transmission mode, the acquiring module is further configured to receive an indication signal sent by the wireless earphone in the wireless transmission mode, where the indication signal is used to instruct the playback device to perform rendering on the original audio signal according to a corresponding preset processing mode, to obtain the to-be-presented audio signal.

In a possible design, before the sending module sends the to-be-presented audio signal to the wireless earphone in the wireless transmission mode, the acquiring module is further configured to receive a performance parameter of the wireless earphone in the wireless transmission mode, and determine an indication signal according to the performance parameter, where the indication signal is used to instruct the playback device to perform rendering on the original audio signal according to a corresponding preset processing mode, to obtain the to-be-presented audio signal.

In a possible design, the acquiring module is further configured to:

acquire a characteristic parameter of the original audio signal, where the characteristic parameter includes at least one of a code stream format, a channel parameter, an object parameter and a scene component parameter; and determine the indication signal, according to the characteristic parameter and the performance parameter.

In an implementation, the indication signal includes an identification code;

where if the identification code is a first field, the playback device does not perform rendering on the original audio signal, the to-be-presented audio signal includes the second audio signal but not the first audio signal, and the wireless earphone performs full rendering on the original audio signal;

if the identification code is a second field, the playback device performs the full rendering on the original audio signal, the to-be-presented audio signal includes the first audio signal but not the second audio signal, and the wireless earphone performs no rendering on the original audio signal; and if the identification code is a third field, the playback device performs rendering on a part of the original audio signal, the to-be-presented audio signal includes the first audio signal and the second audio signal, and the wireless earphone performs rendering on a remaining part of the original audio signal.

In an implementation, the original audio signal includes a fourth audio signal and/or a fifth audio signal, where the fourth audio signal is used to generate, after being processed, the first audio signal, and the fifth audio signal is used to generate the second audio signal;

correspondingly, after the acquiring module acquires the original audio signal, it further includes:

a decoding module, configured to decode the fourth audio signal, to obtain a sixth audio signal, where the sixth audio signal includes a seventh audio signal and/or an eighth audio signal;

a rendering module, configured to perform rendering processing on the seventh audio signal, to obtain a ninth audio signal; and an encoding module, configured to encode the eighth audio signal and the ninth audio signal, to obtain a tenth audio signal, and the to-be-presented audio signal includes the fifth audio signal and the tenth audio signal.

In a possible design, the rendering module is specifically configured to:

perform the rendering processing on the seventh audio signal according to rendering metadata, to obtain the ninth audio signal, where the rendering metadata includes first metadata and second metadata, the first metadata is metadata at a side of the playback device, and the second metadata is metadata at a side of the wireless earphone.

In a possible design, the first metadata includes first sensor sub-module metadata, where the first sensor sub-module metadata is used to characterize a motion characteristic of the playback device; and/or the second metadata includes second sensor sub-module metadata and a head related transfer function HRTF database, where the second sensor sub-module metadata is used to characterize a motion characteristic of the wireless earphone.

In a possible design, the first sensor sub-module metadata is acquired by a first sensor sub-module, and the first sensor sub-module includes at least one of a gyroscope sensor sub-module, a head size sensor sub-module, a ranging sensor sub-module, a geomagnetic sensor sub-module and an acceleration sensor sub-module; and/or the second sensor sub-module metadata is acquired by a second sensor sub-module, and the second sensor sub-module includes at least one of a gyroscope sensor sub-module, a head size sensor sub-module, a ranging sensor sub-module, a geomagnetic sensor sub-module and an acceleration sensor sub-module.

In an implementation, the to-be-presented audio signal includes at least one of a channel-based audio signal, an object-based audio signal and a scene-based audio signal.

In an implementation, the rendering processing includes at least one of binaural virtual rendering, channel signal rendering, object signal rendering and scene signal rendering.

In an implementation, the wireless transmission mode includes Bluetooth communication, infrared communication, WIFI communication and LIFI visible light communication.

It is worth noting that the audio processing apparatus provided by the embodiment shown in FIG. 13 may implement the method corresponding to the playback device as provided by any of the above method embodiments, and its specific implementation principle, technical features, explanation of technical terms and technical effects are similar, which will not be repeated here.

Figure 14:
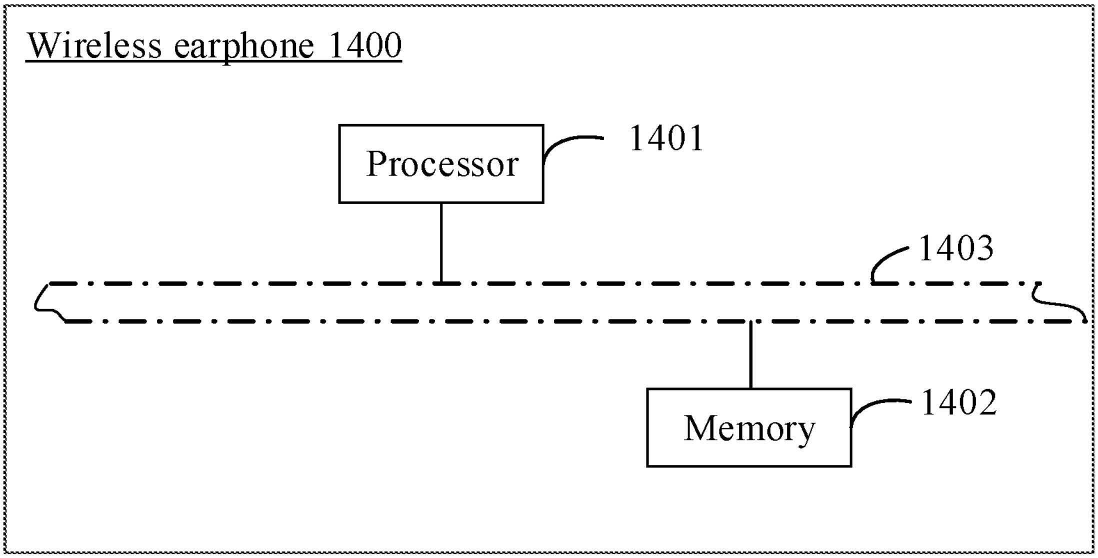
FIG. 14 is a schematic structural diagram of a wireless earphone provided by the present disclosure.

FIG. 14 is a schematic structural diagram of a wireless earphone provided by the present disclosure. As shown in FIG. 14, the wireless earphone 1400 may include at least one processor 1401 and a memory 1402. In FIG. 14, the wireless earphone with one processor is illustrated as an example.

The memory 1402 is used to store a program. Specifically, the program may include program codes including computer operation instructions.

The memory 1402 may include a high-speed RAM memory, or a non-volatile memory, such as at least one disk memory.

The processor 1401 is used to execute the computer-executed instructions stored in the memory 1402, to realize the methods corresponding to the wireless earphone described in the above method embodiments.

The processor 1401 may be a central processing unit (CPU for short), an application specific integrated circuit (ASIC for short), or one or more integrated circuits configured to implement the embodiments of the present disclosure.

In an implementation, the memory 1402 may be independent of or integrated with the processor 1401. When the memory 1402 is a device independent of the processor 1401, the wireless earphone 1400 may further include:

a bus 1403, configured to connect the processor 1401 and the memory 1402. The bus may be an industry standard architecture (ISA) bus, a peripheral component (PCI) bus or an extended industry standard architecture (EISA) bus. The bus may be divided into an address bus, a data bus, a control bus, etc., but it does not mean that there is only one bus or one type of bus.

In an implementation, in specific implementation, if the memory 1402 and the processor 1401 are integrated on one chip, the memory 1402 and the processor 1401 may communicate with each other through an internal interface.

Figure 15:
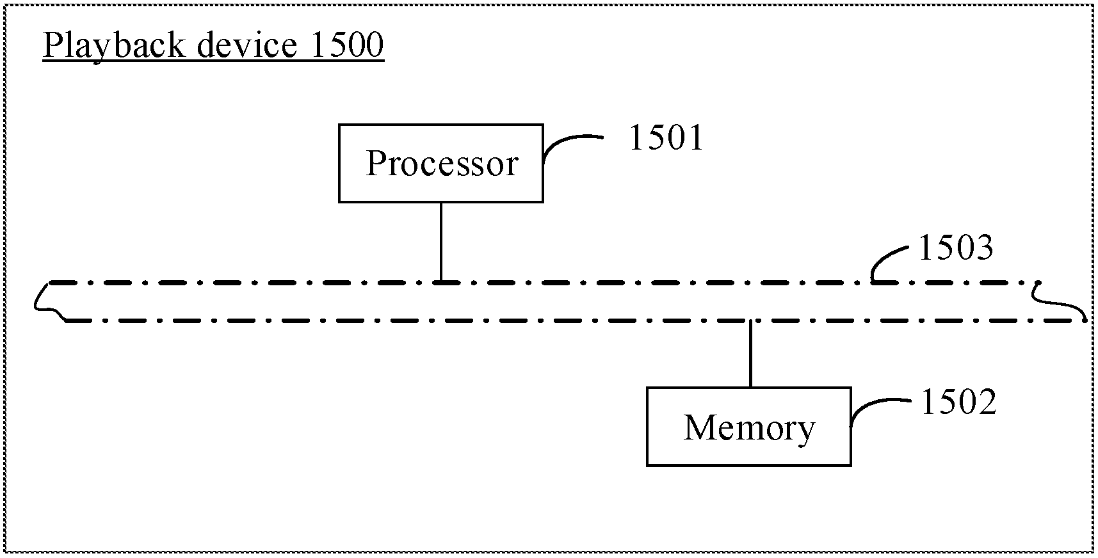
FIG. 15 is another schematic structural diagram of a playback device provided by the present disclosure.

FIG. 15 is another schematic structural diagram of a playback device provided in this disclosure. As shown in FIG. 15, the playback device 1500 may include at least one processor 1501 and a memory 1502. In FIG. 15, the playback device with one processor is illustrated as an example.

The memory 1502 is to store a program. Specifically, the program may include program codes including computer operation instructions.

The memory 1502 may include a high-speed RAM memory, or a non-volatile memory, such as at least one disk memory.

The processor 1501 is used to execute the computer-executed instructions stored in the memory 1502, to realize the methods corresponding to the playback device described in the above method embodiments.

The processor 1501 may be a central processing unit (CPU for short), an application specific integrated circuit (ASIC for short), or one or more integrated circuits configured to implement the embodiments of the present disclosure.

In an implementation, the memory 1502 may be independent of or integrated with the processor 1501. When the memory 1502 is a device independent of the processor 1501, the playback device 1500 may further include:

a bus 1503, configured to connect the processor 1501 and the memory 1502. The bus may be an industry standard architecture (ISA) bus, a peripheral component (PCI) bus or an extended industry standard architecture (EISA) bus. The bus may be divided into an address bus, a data bus, a control bus, etc., but it does not mean that there is only one bus or one type of bus.

In an implementation, in specific implementation, if the memory 1502 and the processor 1501 are integrated on one chip, the memory 1502 and the processor 1501 may communicate with each other through an internal interface.

The disclosure also provides a computer-readable storage medium, which may include: U disk, mobile hard disk, read-only memory (ROM), random access memory (RAM), magnetic disk or optical disk, and other media that may store program codes. Specifically, the computer-readable storage medium stores program instructions, and the program instructions are used for the methods corresponding to the wireless earphone in the above embodiments.

The disclosure also provides a computer-readable storage medium, which may include U disk, mobile hard disk, read-only memory (ROM), random access memory (RAM), magnetic disk or optical disk, and other media that may store program codes. Specifically, the computer-readable storage medium stores program instructions, and the program instructions are used for the methods corresponding to the playback device in the above embodiments.

Finally, it should be explained that the above embodiments are only used to illustrate the technical solutions of the present disclosure, but not to limit it. Although the disclosure has been explained in detail with reference to the above embodiments, those ordinary skilled in the art should understand that they can still modify the technical solutions described in the above embodiments, or equivalently replace some or all of the technical features therein; however, these modifications or substitutions do not make the essence of the corresponding technical solutions deviate from the scope of the technical solutions of the above embodiments.

What is claimed is:

1. An audio processing method, applied to a wireless earphone, the method comprising:

receiving a to-be-presented audio signal sent by a playback device in a wireless transmission mode, wherein the to-be-presented audio signal comprises at least one of a first audio signal and a second audio signal, the first audio signal is an audio signal that has undergone rendering processing performed by the playback device, and the second audio signal is an audio signal that is to be rendered;

performing the rendering processing on the second audio signal, to obtain a third audio signal, if the to-be-presented audio signal comprises the second audio signal; and performing subsequent audio playing, according to at least one of the first audio signal and the third audio signal;

wherein before the receiving the to-be-presented audio signal sent by the playback device in the wireless transmission mode, the method comprises:

sending an indication signal to the playback device in the wireless transmission mode, wherein the indication signal is used to instruct the playback device to perform rendering on an original audio signal according to a corresponding preset processing mode, to obtain the to-be-presented audio signal;

wherein the indication signal comprises an identification code;

wherein if the identification code is a first field, the playback device does not perform rendering on the original audio signal, the to-be-presented audio signal comprises the second audio signal but not the first audio signal, and the wireless earphone performs full rendering on the original audio signal;

if the identification code is a second field, the playback device performs the full rendering on the original audio signal, the to-be-presented audio signal comprises the first audio signal but not the second audio signal, and the wireless earphone performs no rendering on the original audio signal; and if the identification code is a third field, the playback device performs rendering on a part of the original audio signal, the to-be-presented audio signal comprises the first audio signal and the second audio signal, and the wireless earphone performs rendering on a remaining part of the original audio signal.

2. The audio processing method according to claim 1, wherein before the sending the indication signal to the playback device in the wireless transmission mode, the method further comprises:

acquiring a performance parameter of the wireless earphone, and determining the indication signal according to the performance parameter; or acquiring a performance parameter of the wireless earphone; receiving audio characteristic information sent by the playback device, wherein the audio characteristic information comprises a characteristic parameter of the original audio signal input to the playback device, and the characteristic parameter comprises at least one of a bitstream format, a channel parameter, an object parameter and a scene component parameter; and determining the indication signal, according to the performance parameter and the characteristic parameter.

3. The audio processing method according to claim 1, wherein after the receiving the to-be-presented audio signal sent by the playback device in the wireless transmission mode, the method further comprises:

performing decoding processing on the to-be-presented audio signal, to obtain the at least one of the first audio signal and the second audio signal.

4. The audio processing method according to claim 1, wherein the performing the rendering processing on the second audio signal to obtain the third audio signal, comprises:

performing the rendering processing on the second audio signal according to rendering metadata, to obtain the third audio signal, wherein the rendering metadata comprises first metadata and second metadata, the first metadata is metadata at a side of the playback device, and the second metadata is metadata at a side of the wireless earphone;

wherein the first metadata comprises playback device sensor metadata, and the playback device sensor metadata is used to characterize a motion characteristic of the playback device; and the second metadata comprises earphone sensor metadata and a head related transfer function (HRTF) database, and the earphone sensor metadata is used to characterize a motion characteristic of the wireless earphone; and wherein the earphone sensor metadata is acquired by an earphone sensor, and the earphone sensor comprises at least one of a gyroscope sensor, a head size sensor, a ranging sensor, a geomagnetic sensor and an acceleration sensor; and the playback device sensor metadata is acquired by a playback device sensor, and the playback device sensor comprises at least one of a gyroscope sensor, a head size sensor, a ranging sensor, a geomagnetic sensor and an acceleration sensor.

5. The audio processing method according to claim 4, wherein the wireless earphone comprises a first wireless earphone and a second wireless earphone;

the first wireless earphone or the second wireless earphone is provided with the earphone sensor; or each of the first wireless earphone and the second wireless earphone is provided with the earphone sensor, and the first wireless earphone and the second wireless earphone synchronize the earphone sensor metadata therebetween after respectively acquiring the earphone sensor metadata.

6. The audio processing method according to claim 1, wherein the wireless earphone comprises a first wireless earphone and a second wireless earphone, the first wireless earphone and the second wireless earphone are used to establish a wireless connection with the playback device, and the receiving the to-be-presented audio signal sent by the playback device in the wireless transmission mode comprises:

receiving, by the first wireless earphone, a first to-be-presented audio signal sent by the playback device, and receiving, by the second wireless earphone, a second to-be-presented audio signal sent by the playback device; and correspondingly, the performing rendering processing in the wireless earphone comprises:

performing the rendering processing, by the first wireless earphone, on the first to-be-presented audio signal, to obtain a first playback audio signal, and performing the rendering processing, by the second wireless earphone, on the second to-be-presented audio signal, to obtain a second playback audio signal; and playing the first playback audio signal by the first wireless earphone, and playing the second playback audio signal by the second wireless earphone.

7. The audio processing method according to claim 6, wherein before the performing the rendering processing, by the first wireless earphone, on the first to-be-presented audio signal, the method further comprises:

performing decoding processing, by the first wireless earphone, on the first to-be-presented audio signal, to obtain a first decoded audio signal; and correspondingly, the performing the rendering processing, by the first wireless earphone, on the first to-be-presented audio signal comprises:

performing the rendering processing, by the first wireless earphone, according to the first decoded audio signal and rendering metadata, to obtain the first playback audio signal; and before the performing the rendering processing, by the second wireless earphone, on the second to-be-presented audio signal, the method further comprises:

performing decoding processing, by the second wireless earphone, on the second to-be-presented audio signal, to obtain a second decoded audio signal; and correspondingly, the performing the rendering processing, by the second wireless earphone, on the second to-be-presented audio signal comprises:

performing the rendering processing, by the second wireless earphone, according to the second decoded audio signal and the rendering metadata, to obtain the second playback audio signal.

8. The audio processing method according to claim 7, wherein the rendering metadata comprises at least one of first wireless earphone metadata, second wireless earphone metadata and playback device metadata;

wherein the first wireless earphone metadata comprises first earphone sensor metadata and a HRTF database, and the first earphone sensor metadata is used to characterize a motion characteristic of the first wireless earphone;

the second wireless earphone metadata comprises second earphone sensor metadata and a HRTF database, wherein the second earphone sensor metadata is used to characterize a motion characteristic of the second wireless earphone; and the playback device metadata comprises playback device sensor metadata, wherein the playback device sensor metadata is used to characterize a motion characteristic of the playback device.

9. The audio processing method according to claim 8, wherein before the performing the rendering processing, the method further comprises:

synchronizing the rendering metadata between the first wireless earphone and the second wireless earphone.

10. The audio processing method according to claim 9, wherein if the first wireless earphone is provided with an earphone sensor, the second wireless earphone is not provided with an earphone sensor, and the playback device is not provided with a playback device sensor, the synchronizing the rendering metadata between the first wireless earphone and the second wireless earphone comprises:

sending, by the first wireless earphone, the first earphone sensor metadata to the second wireless earphone, and taking, by the second wireless earphone, the first earphone sensor metadata as the second earphone sensor metadata.

11. The audio processing method according to claim 9, wherein if each of the first wireless earphone and the second wireless earphone is provided with an earphone sensor, and the playback device is not provided with a playback device sensor, the synchronizing the rendering metadata between the first wireless earphone and the second wireless earphone comprises:

sending, by the first wireless earphone, the first earphone sensor metadata to the second wireless earphone, and sending, by the second wireless earphone, the second earphone sensor metadata to the first wireless earphone; and determining, by each of the first wireless earphone and the second wireless earphone, the rendering metadata, according to the first earphone sensor metadata, the second earphone sensor metadata and a preset numerical algorithm; or sending, by the first wireless earphone, the first earphone sensor metadata to the playback device, and sending, by the second wireless earphone, the second earphone sensor metadata to the playback device, to cause the playback device to determine the rendering metadata, according to the first earphone sensor metadata, the second earphone sensor metadata and a preset numerical algorithm; and receiving, by each of the first wireless earphone and the second wireless earphone, the rendering metadata.

12. The audio processing method according to claim 9, wherein if the first wireless earphone is provided with an earphone sensor, the second wireless earphone is not provided with an earphone sensor, and the playback device is provided with a playback device sensor, the synchronizing the rendering metadata between the first wireless earphone and the second wireless earphone comprises:

sending, by the first wireless earphone, the first earphone sensor metadata to the playback device, to cause the playback device to determine the rendering metadata, according to the first earphone sensor metadata, the playback device sensor metadata and a preset numerical algorithm; and receiving, by each of the first wireless earphone and the second wireless earphone, the rendering metadata; or receiving, by the first wireless earphone, the playback device sensor metadata sent by the playback device; determining, by the first wireless earphone, the rendering metadata, according to the first earphone sensor metadata, the playback device sensor metadata and a preset numerical algorithm; and sending, by the first wireless earphone, the rendering metadata to the second wireless earphone.

13. The audio processing method according to claim 9, wherein if each of the first wireless earphone and the second wireless earphone is provided with an earphone sensor, and the playback device is provided with a playback device sensor, the synchronizing the rendering metadata between the first wireless earphone and the second wireless earphone comprises:

sending, by the first wireless earphone, the first earphone sensor metadata to the playback device, and sending, by the second wireless earphone, the second earphone sensor metadata to the playback device, to cause the playback device to determine the rendering metadata, according to the first earphone sensor metadata, the second earphone sensor metadata, the playback device sensor metadata and a preset numerical algorithm; and receiving, by each of the first wireless earphone and the second wireless earphone, the rendering metadata; or sending, by the first wireless earphone, the first earphone sensor metadata to the second wireless earphone, and sending, by the second wireless earphone, the second earphone sensor metadata to the first wireless earphone; receiving, by each of the first wireless earphone and the second wireless earphone, the playback device sensor metadata; and determining, by each of the first wireless earphone and the second wireless earphone, the rendering metadata, according to the first earphone sensor metadata, the second earphone sensor metadata, the playback device sensor metadata and a preset numerical algorithm.

14. The audio processing method according to claim 1, wherein the to-be-presented audio signal comprises at least one of a channel-based audio signal, an object-based audio signal and a scene-based audio signal;

wherein the rendering processing comprises at least one of binaural virtual rendering, channel signal rendering, object signal rendering and scene signal rendering; and wherein the wireless transmission mode comprises Bluetooth communication, infrared communication, WIFI communication and LIFI visible light communication.

15. An audio processing method, applied to a playback device, the method comprising:

acquiring an original audio signal, and generating a to-be-presented audio signal according to the original audio signal, wherein the to-be-presented audio signal comprises at least one of a first audio signal and a second audio signal, the first audio signal is an audio signal that has undergone rendering processing performed by the playback device, and the second audio signal is an audio signal that is to be rendered; and sending the to-be-presented audio signal to a wireless earphone in a wireless transmission mode;

wherein before the sending the to-be-presented audio signal to the wireless earphone in the wireless transmission mode, the method comprises:

receiving an indication signal sent by the wireless earphone in the wireless transmission mode, wherein the indication signal is used to instruct the playback device to perform rendering on the original audio signal according to a corresponding preset processing mode, to obtain the to-be-presented audio signal;

wherein the indication signal comprises an identification code;

wherein if the identification code is a first field, the playback device does not perform rendering on the original audio signal, the to-be-presented audio signal comprises the second audio signal but not the first audio signal, and the wireless earphone performs full rendering on the original audio signal;

if the identification code is a second field, the playback device performs the full rendering on the original audio signal, the to-be-presented audio signal comprises the first audio signal but not the second audio signal, and the wireless earphone performs no rendering on the original audio signal; and if the identification code is a third field, the playback device performs rendering on a part of the original audio signal, the to-be-presented audio signal comprises the first audio signal and the second audio signal, and the wireless earphone performs rendering on a remaining part of the original audio signal.

16. The audio processing method according to claim 15, wherein before the sending the to-be-presented audio signal to the wireless earphone in the wireless transmission mode, the method further comprises:

receiving a performance parameter of the wireless earphone in the wireless transmission mode, and determining an indication signal according to the performance parameter, wherein the indication signal is used to instruct the playback device to perform rendering on the original audio signal according to a corresponding preset processing mode, to obtain the to-be-presented audio signal; or receiving a performance parameter of the wireless earphone in the wireless transmission mode; acquiring a characteristic parameter of the original audio signal, wherein the characteristic parameter comprises at least one of a bitstream format, a channel parameter, an object parameter and a scene component parameter; and determining the indication signal, according to the characteristic parameter and the performance parameter.

17. A wireless earphone, comprising:

a processor; and a memory configured to store a computer program of the processor;

wherein the processor is configured to execute the computer program to implement an audio processing method comprising:

receiving a to-be-presented audio signal sent by a playback device in a wireless transmission mode, wherein the to-be-presented audio signal comprises at least one of a first audio signal and a second audio signal, the first audio signal is an audio signal that has undergone rendering processing performed by the playback device, and the second audio signal is an audio signal that is to be rendered;

performing the rendering processing on the second audio signal, to obtain a third audio signal, if the to-be-presented audio signal comprises the second audio signal; and performing subsequent audio playing, according to at least one of the first audio signal and the third audio signal;

wherein before the receiving the to-be-presented audio signal sent by the playback device in the wireless transmission mode, the method comprises:

sending an indication signal to the playback device in the wireless transmission mode, wherein the indication signal is used to instruct the playback device to perform rendering on an original audio signal according to a corresponding preset processing mode, to obtain the to-be-presented audio signal;

wherein the indication signal comprises an identification code;

wherein if the identification code is a first field, the playback device does not perform rendering on the original audio signal, the to-be-presented audio signal comprises the second audio signal but not the first audio signal, and the wireless earphone performs full rendering on the original audio signal;

if the identification code is a second field, the playback device performs the full rendering on the original audio signal, the to-be-presented audio signal comprises the first audio signal but not the second audio signal, and the wireless earphone performs no rendering on the original audio signal; and if the identification code is a third field, the playback device performs rendering on a part of the original audio signal, the to-be-presented audio signal comprises the first audio signal and the second audio signal, and the wireless earphone performs rendering on a remaining part of the original audio signal.

* * * * *